United States Patent
Takeyama

(10) Patent No.: US 8,225,663 B2
(45) Date of Patent: Jul. 24, 2012

(54) TUNING FORK-TYPE VIBRATOR, TUNING FORK-TYPE VIBRATOR MANUFACTURING METHOD, AND ANGULAR VELOCITY SENSOR

(75) Inventor: Koji Takeyama, Toyama (JP)

(73) Assignee: Murata Manufacturing Co., Ltd., Kyoto (JP)

(*) Notice: Subject to any disclaimer, the term of this patent is extended or adjusted under 35 U.S.C. 154(b) by 463 days.

(21) Appl. No.: 12/539,833

(22) Filed: Aug. 12, 2009

(65) Prior Publication Data

US 2010/0050768 A1  Mar. 4, 2010

(30) Foreign Application Priority Data

Sep. 2, 2008  (JP) ................. 2008-224571

(51) Int. Cl.
*G01P 9/04* (2006.01)
*G01C 19/56* (2006.01)

(52) U.S. Cl. .................... 73/504.16

(58) Field of Classification Search .............. 73/514.16, 73/514.12, 504.04, 504.15; 310/370
See application file for complete search history.

(56) References Cited

U.S. PATENT DOCUMENTS

| | | | | |
|---|---|---|---|---|
| 4,349,763 A * | 9/1982 | Hoshi et al. | ...... | 310/370 |
| 4,410,827 A * | 10/1983 | Kogure | ...... | 310/370 |
| 4,429,248 A * | 1/1984 | Chuang | ...... | 310/370 |
| 5,481,913 A * | 1/1996 | Ito et al. | ...... | 73/504.16 |
| 5,691,595 A * | 11/1997 | Tomikawa et al. | ...... | 310/370 |
| 6,105,426 A * | 8/2000 | Yachi et al. | ...... | 73/504.16 |
| 6,134,963 A | 10/2000 | Ishikawa et al. | | |
| 7,067,966 B2 * | 6/2006 | Tanaya | ...... | 310/367 |
| 7,071,794 B2 * | 7/2006 | Kawashima | ...... | 333/187 |
| 7,279,824 B2 * | 10/2007 | Tanaya et al. | ...... | 310/344 |
| 7,352,117 B2 * | 4/2008 | Kawanishi et al. | ...... | 310/370 |
| 7,518,291 B2 * | 4/2009 | Tanaya | ...... | 310/348 |
| 7,637,159 B2 * | 12/2009 | Yamamoto et al. | ...... | 73/504.16 |
| 7,659,798 B2 * | 2/2010 | Yamada | ...... | 333/200 |
| 7,902,729 B2 * | 3/2011 | Kawanishi et al. | ...... | 310/348 |
| 7,986,077 B2 * | 7/2011 | Yamamoto | ...... | 310/370 |
| 2005/0000934 A1 | 1/2005 | Nakatani et al. | | |
| 2006/0162449 A1 | 7/2006 | Matsudo et al. | | |
| 2006/0219007 A1 * | 10/2006 | Kawauchi | ...... | 73/504.12 |

FOREIGN PATENT DOCUMENTS

| | | |
|---|---|---|
| JP | 08-094362 A | 4/1996 |
| JP | 08-114457 A | 5/1996 |
| JP | 08-313265 A | 11/1996 |
| JP | 11-094554 A | 4/1999 |
| JP | 2002-257549 A | 9/2002 |
| JP | 2004-079869 A | 3/2004 |
| JP | 2004-093158 A | 3/2004 |

(Continued)

*Primary Examiner* — Helen C. Kwok
(74) *Attorney, Agent, or Firm* — Keating & Bennett, LLP

(57) ABSTRACT

A tuning fork-type piezoelectric vibrator includes a substantially rectangular plate-shaped base to be supported by a circuit substrate and two pillar-shaped legs. The base includes a substantially rectangular plate-shaped junction arranged to be connected to the circuit substrate, and a body disposed between the junction and the two legs. In order for the difference between the resonant frequency in the drive mode of the tuning fork-type piezoelectric vibrator and the resonant frequency in in-plane, in-phase mode thereof to be at least about 1 kHz, the base and two legs are configured so that the product of the length of the body divided by the substantial width of the body minus the width of the legs and the resonant frequency in drive mode is at least about $60 \times 10^3$.

6 Claims, 15 Drawing Sheets

FOREIGN PATENT DOCUMENTS

| JP | 2004-233288 A | 8/2004 |
| JP | 2004-279271 A | 10/2004 |
| JP | 2005-345404 A | 12/2005 |
| JP | 2006-208030 A | 8/2006 |

* cited by examiner

TUNING FORK-TYPE VIBRATOR, TUNING FORK-TYPE VIBRATOR MANUFACTURING METHOD, AND ANGULAR VELOCITY SENSOR

BACKGROUND OF THE INVENTION

1. Field of the Invention

The present invention relates to a tuning fork-type vibrator, a tuning fork-type vibrator manufacturing method, and an angular velocity sensor. In particular, the present invention relates to a tuning fork-type vibrator that includes a base to be supported by a base substrate such as a circuit substrate, and legs extending from the base, and that can be used in an angular velocity sensor, and a method for manufacturing the same.

2. Description of the Related Art

FIG. 13 is a drawing showing an example of a related-art tuning fork-type vibrator. A tuning fork-type vibrator 1 shown in FIG. 13 includes a base 2 and two legs 3a and 3b extending from the base 2. The tuning fork-type vibrator 1 is supported by a substrate 5 with a supporting member connected to the base 2, such as a supporting substrate 4, interposed therebetween (see, for example, Japanese Unexamined Patent Application Publication No. 2005-345404).

FIG. 14 is a drawing showing another example of a related-art tuning fork-type vibrator. A tuning fork-type vibrator 1 shown in FIG. 14 includes a base 2 and two legs 3a and 3b extending from the base 2 and is supported by a substrate (not shown) with a supporting member provided in the center of an edge of the base 2, such as a supporting pedestal 6, interposed therebetween (see, for example, Japanese Unexamined Patent Application Publication No. 2004-233288).

FIG. 15 is a drawing showing yet another example of a related-art tuning fork-type vibrator. A tuning fork-type vibrator 1 shown in FIG. 15 includes a base 2 and two legs 3a and 3b extending from the base 2 and is supported by a substrate (not shown) with a pedestal 7 connected to the base 2 interposed therebetween (see, for example, Japanese Unexamined Patent Application Publication No. 2006-208030).

When subjected to the application of a drive signal, any of the tuning fork-type vibrators 1 shown in FIGS. 13 to 15 make basic vibrations at the resonant frequency in drive mode such that the legs 3a and 3b are both opened or closed in a plane having the legs. When a rotation angular velocity is applied about an axis parallel to the longitudinal direction of each tuning fork-type vibrator 1 in this basic vibration state, a Coriolis force is applied to the legs 3a and 3b in opposite directions perpendicular to the directions of the basic vibrations. As a result, the legs 3a and 3b are displaced in the opposite directions. For this reason, the rotation angular velocity can be detected from a signal output from each tuning fork-type vibrator 1 in relation to the displacements of the two legs 3a and 3b thereof. Thus, the tuning fork-type vibrators 1 can be used in an angular velocity sensor.

However, in each of the tuning fork-type vibrators 1 shown in FIGS. 13 to 15, in-plane, in-phase vibrations occur around the resonant frequency in the drive mode. Therefore, these tuning fork-type vibrators are significantly negatively affected by interference between drive vibrations and in-plane, in-phase vibrations. For this reason, if each tuning fork-type vibrator 1 is used, for example, in an angular velocity sensor, basic characteristics of the angular velocity sensor, such as the sensitivity and the offset thereof, are destabilized. In this specification, the phrase "in-place, in-phase vibrations" means that the two legs of a tuning fork-type vibrator vibrate in phase with each other in a location having the two legs, that is, the legs vibrate as directed in one direction simultaneously rather than vibrating such that the legs are both opened or closed.

In addition, each of the tuning fork-type vibrators 1 shown in FIGS. 13 to 15, is supported by a substrate with a supporting member, which is a different member, interposed therebetween. Therefore, the number of members is increased and the cost is increased accordingly.

In particular, the tuning fork-type vibrator 1 shown in FIG. 14 is supported at the center in the width direction, of the base 2. For this reason, the electrode structure that connects the vibrator to a substrate is relatively complicated. Also, since the tuning fork-type vibrator 1 is supported at the center thereof using a structure that directly connects the vibrator to a substrate, it is difficult to control the mounting of the tuning fork-type vibrator, the application of an adhesive, and other assembly processes, and the cost is increased accordingly.

SUMMARY OF THE INVENTION

To overcome the problems described above, preferred embodiments of the present invention provide a tuning fork-type vibrator that is prevented from becoming negatively affected by interference between drive vibrations and in-place, in-phase vibrations, a method for manufacturing a tuning fork-type vibrator that is prevented from becoming negatively affected by interference between drive vibrations and in-place, in-phase vibrations, and an angular velocity sensor including a tuning fork-type vibrator that is prevented from becoming negatively affected by interference between drive vibrations and in-place, in-phase vibrations.

A tuning fork-type vibrator according to a first preferred embodiment of the present invention includes a base to be supported by a base substrate and a leg extending from the base. The base includes a junction to be connected to the base substrate and a body disposed between the junction and the leg. The base, including the body, and the leg are configured so that the product of the length of the body divided by the substantial width of the body minus the width of the leg and a resonant frequency in drive mode is at least about $60 \times 10^3$, for example. In this specification, the phrase "substantial width of the body" refers to the average width of the body.

In the tuning fork-type vibrator according to the first preferred embodiment of the present invention, a recess may preferably be provided on the body so that the substantial width of the body is less than the width of the widest portion of the body.

A tuning fork-type vibrator manufacturing method according to a second preferred embodiment of the present invention is a method for manufacturing a tuning fork-type vibrator, the tuning fork-type vibrator including a base to be supported by a base substrate and a leg extending from the base, the base including a junction to be connected to the base substrate and a body disposed between the junction and the leg. The method includes the step of forming the base, including the body, and the leg using a relationship between the length of the body divided by the substantial width of the body minus the width of the leg and a resonant frequency in drive mode.

An angular velocity sensor according to a third preferred embodiment of the present invention includes one of the tuning fork-type vibrator according to the first preferred embodiment of the present invention and a tuning fork-type vibrator obtained using the manufacturing method according to the second preferred embodiment of the present invention.

In the tuning fork-type vibrator according to the first preferred embodiment of the present invention, the base, including the body, and the two legs are configured so that the product of the length of the body divided by the substantial width of the body minus the width of the leg and the resonant frequency in drive mode is at least about $60 \times 10^3$, for example. Thus, the difference between the resonant frequency in the drive mode and the resonant frequency (in-plane, in-phase frequency) in in-plane, in-phase mode is at least about 1 kHz, for example. If the frequency difference is less than about 1 kHz, the tuning fork-type vibrator may be negatively affected by interference between drive vibrations and in-place, in-phase vibrations. Therefore, if the tuning fork-type vibrator having such a frequency difference is used in an angular velocity sensor, basic characteristics of the angular velocity sensor, such as the sensitivity and the offset thereof, are destabilized. On the other hand, the tuning fork-type vibrator according to the first preferred embodiment of the present invention, in which the frequency difference is at least about 1 kHz, is prevented from becoming negatively affected by interference between drive vibrations and in-place, in-phase vibrations. Therefore, if such a tuning fork-type vibrator is used in an angular velocity sensor, basic characteristics of the angular velocity sensor, such as the sensitivity and the offset thereof, are stabilized.

Also, in the tuning fork-type vibrator according to the first preferred embodiment, the recess is arranged in the body so that the substantial width of the body is less than the width of the widest portion of the body. Thus, the substantial width of the body is reduced. As a result, the length of the body is reduced while ensuring the junction having the same size. Thus, the size of the tuning fork-type vibrator is reduced.

In the manufacturing method according to the second preferred embodiment of the present invention, the base, including the body, and the legs are configured according to the relationship between the length of the body divided by the substantial width of the body minus the width of the leg and the resonant frequency in the drive mode. This makes it possible to manufacture the above-mentioned tuning fork-type vibrator according to the first preferred embodiment of the present invention that is prevented from becoming negatively affected by interference between drive vibrations and in-place, in-phase vibrations.

With the second preferred embodiment of the present invention, a tuning fork-type vibrator that is prevented from becoming negatively affected by interference between drive vibrations and in-place, in-phase vibrations is obtained.

Also, with the third preferred embodiment of the present invention, an angular velocity sensor using a tuning fork-type vibrator that is prevented from becoming negatively affected by interference between drive vibrations and in-place, in-phase vibrations is obtained.

The above-mentioned advantages and other advantages achieved by preferred embodiments of the present invention will be further clarified from the description of the following preferred embodiments of the present invention with reference to the accompanying drawings.

Other features, elements, arrangements, steps, characteristics and advantages of the present invention will become more apparent from the following detailed description of preferred embodiments of the present invention, with reference to the attached drawings.

DETAILED DESCRIPTION OF PREFERRED EMBODIMENT

Figure 1:
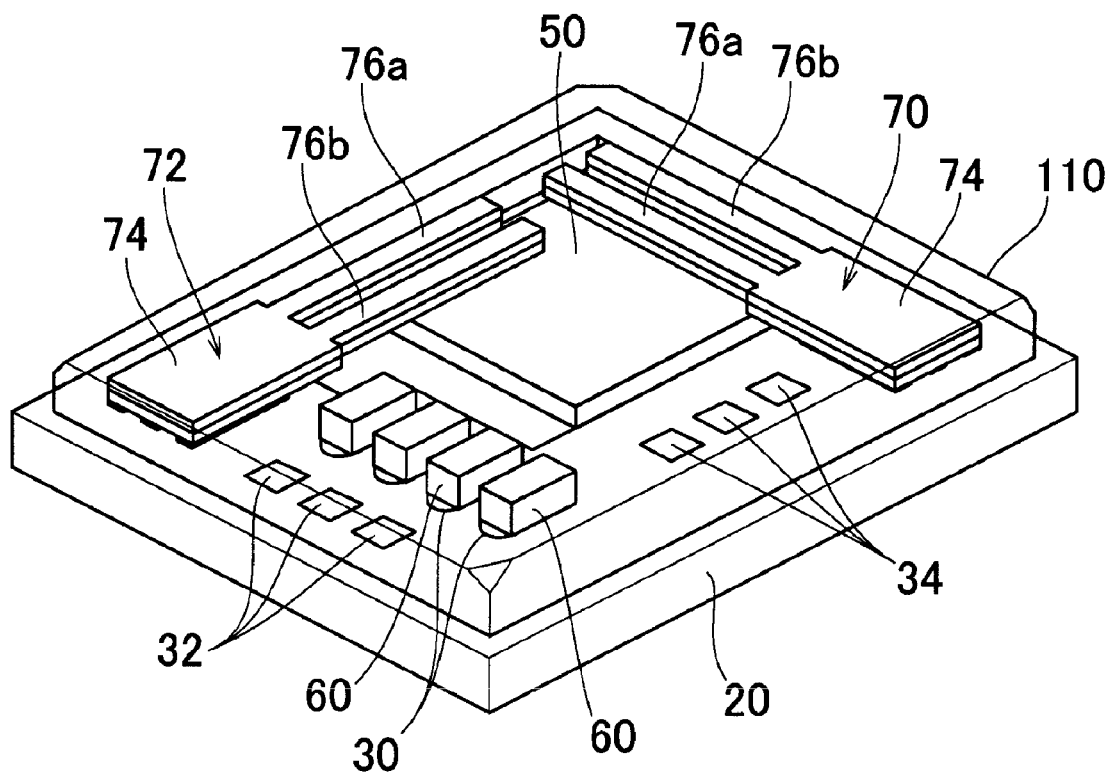
FIG. 1 is an internal perspective view showing an example of an angular velocity sensor according to a preferred embodiment of the present invention.
Figure 2:
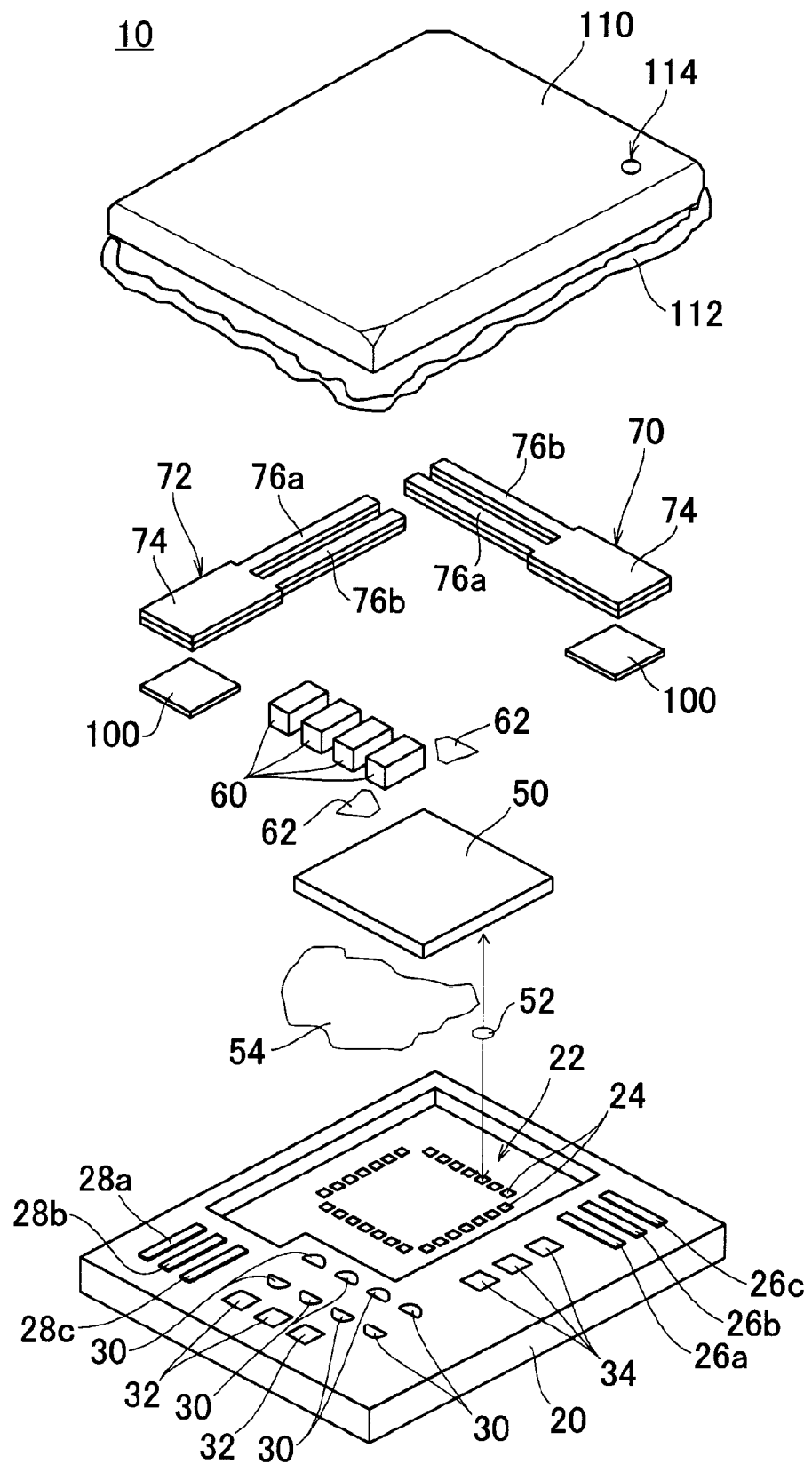
FIG. 2 is an exploded perspective view of the angular velocity sensor shown in FIG. 1.

FIG. 1 is an internal perspective view showing an example of an angular velocity sensor according to a preferred embodiment of the present invention. FIG. 2 is an exploded perspective view of the angular velocity sensor. An angular velocity sensor 10 shown in FIGS. 1 and 2 includes a circuit substrate 20 defining a base substrate. The circuit substrate 20 is preferably configured in the shape of, for example, a substantially rectangular plate. The circuit substrate 20 includes a recess 22 on a first surface thereof. The recess 22 is preferably arranged, for example, in a location near one corner of the circuit substrate 20. In FIG. 2, the recess 22 has the shape of a hook. However, it may have any shape as long as the shape is one that can accommodate an IC to be described later. For example, the recess 22 may preferably have a different shape, such as a square, for example.

Inside the recess 22 of the circuit substrate 20, a plurality of electrodes 24 are preferably arranged, for example, in the form of a square. Outside the recess 22 of the circuit substrate 20 and near a short side of the circuit substrate 20 close to the recess 22, three rectangular electrodes 26a, 26b, and 26c are arranged side by side. The rectangular electrodes 26a to 26c are disposed so that the longitudinal direction thereof is the same or substantially the same as the direction of the short side of the circuit substrate 20 close to the recess 22. Outside the recess 22 of the circuit substrate 20 and near a long side of the circuit substrate 20 close to the recess 22, three rectangular electrodes 28a, 28b, and 28c are arranged side by side. The electrodes 28a to 28c are arranged so that the longitudinal direction thereof is the same or substantially the same as the direction of the long side of the circuit substrate 20 close to the recess 22.

Also, between the recess 22 and a short side of the circuit substrate 20 remote from the recess 22, a plurality of pairs of counter electrodes 30 are provided. Each pair of counter electrodes 30 are opposed to each other in the longitudinal direction of the circuit substrate 20. Further, the plurality of pairs of counter electrodes 30 are arranged along the short side of the circuit substrate 20. Between the counter electrodes 30 and the short side of the circuit substrate 20, a plurality of electrodes 32 are provided. Also, a plurality of electrodes 34 are provided near the electrodes 26a to 26c arranged near the short side of the circuit substrate 20 close to the recess 22. The electrodes 34 are disposed along the long side of the circuit substrate 20 remote from the recess 22.

Figure 3:
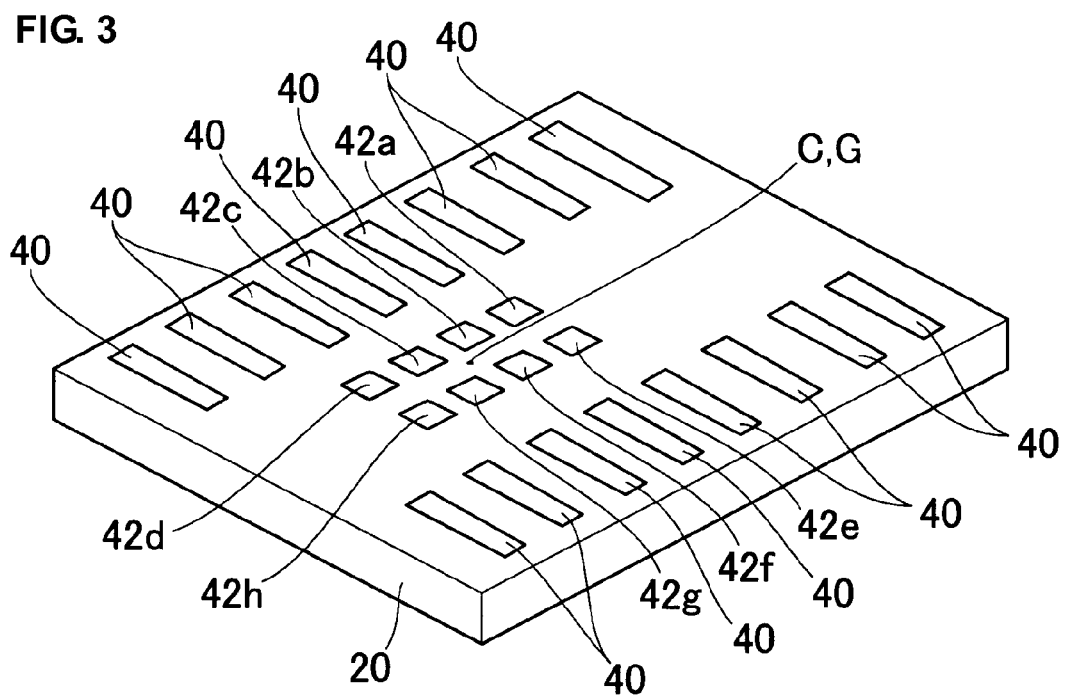
FIG. 3 is a perspective view of a second surface of a circuit substrate used in the angular velocity sensor shown in FIG. 1.

On a second surface of the circuit substrate 20, as shown in FIG. 3, a plurality of external electrodes 40 and eight, for example, inspection electrodes 42a to 42h are preferably provided. The external electrodes 40 are arranged side by side along the opposed long sides of the circuit substrate 20. The inspection electrodes 42a to 42h are arranged side by side inside the external electrodes 40. Four inspection electrodes 42a to 42d and four inspection electrodes 42e to 42h, for example, preferably are disposed along the corresponding long sides of the circuit substrate 20. The approximate center point C of the eight inspection electrodes 42a to 42h is disposed on the second surface of the circuit substrate 20 so that the approximate center point C corresponds to a position G of the barycenter of the whole angular velocity sensor 10.

The circuit substrate 20 is preferably made of, for example, alumina. The electrodes 24, 26a to 26c, 28a to 28c, 30, 32, 34, 40, 42a to 42h provided on the circuit substrate 20 are preferably formed, for example, by plating electrodes made of tungsten with nickel and then gold. The circuit substrate 20 includes many conductive wiring members (not shown), such as via holes and patterns.

An IC 50 is disposed in the recess 22 of the circuit substrate 20. The IC 50 is used to drive tuning fork-type piezoelectric vibrators to be described later and to process signals output from the tuning fork-type piezoelectric vibrators. The IC 50 has a plurality of external electrodes (not shown), which are connected to the electrodes 24 in the recess 22. In this case, for example, gold bumps 52 are preferably provided on the electrodes 24, and the electrodes 24 are connected to the external electrodes of the IC 50 via the gold bumps 52. Also, the IC 50 is fixed to the circuit substrate 20 preferably using underfill 54 made of an epoxy adhesive, for example.

Chip capacitors 60 are connected to the counter electrodes 30 provided on the circuit substrate 20. As the chip capacitors 60, multilayer ceramic capacitors, for example, are preferably used, and external electrodes provided on both ends thereof are connected to the corresponding counter electrodes 30 preferably using pieces of solder 62, for example.

Figure 4:
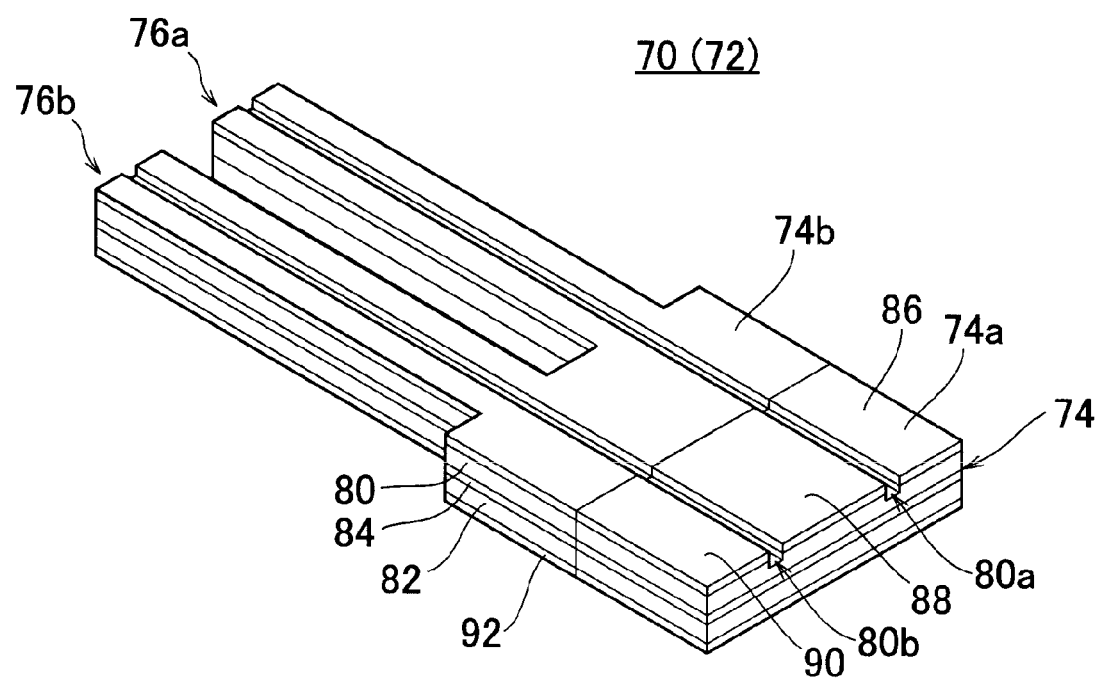
FIG. 4 is a perspective view showing a tuning fork-type piezoelectric vibrator used in the angular velocity sensor shown in FIG. 1.
Figure 5:
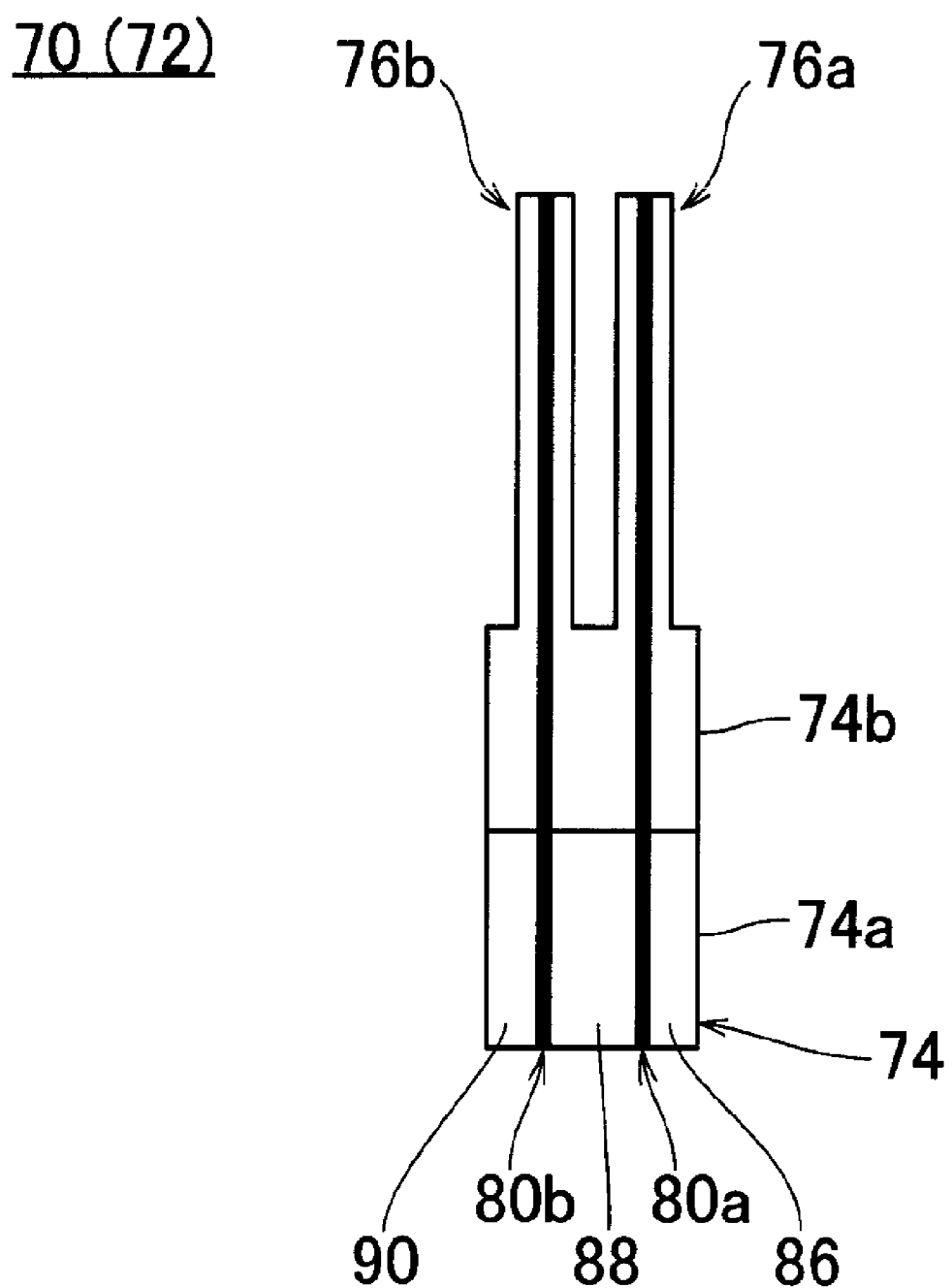
FIG. 5 is a plan view showing the tuning fork-type piezoelectric vibrator shown in FIG. 4.

A first tuning fork-type piezoelectric vibrator 70 and a second tuning fork-type piezoelectric vibrator 72 are attached to the electrodes 26a to 26c and electrodes 28a to 28c, respectively, provided outside the recess 22. The first tuning fork-type piezoelectric vibrator 70 and second tuning fork-type piezoelectric vibrator 72 each preferably include a substantially rectangular plate-shaped base 74, and two pillar-shaped legs 76a and 76b extending from one edge in the longitudinal direction of the base 74. The legs 76a and 76b extend in parallel or substantially in parallel inside both edges in the width direction, of the base 74. The base 74 is to be supported by the circuit substrate 20. As shown in FIGS. 4 and 5, the base 74 preferably includes a substantially rectangular plate-shaped junction 74a and a substantially rectangular plate-shaped body 74b. The junction 74a is a portion to be connected to the circuit substrate 20. The body 74b is a portion disposed between the junction 74a and legs 76a and 76b.

In order for the difference between the resonant frequency (e.g., about 30 kHz) in the drive mode of the first tuning fork-type piezoelectric vibrator 70 and the resonant frequency (in-plane, in-phase frequency) in in-plane, in-phase mode thereof to be at least about 1 kHz, the base 74, including the junction 74a and the body 74b, and the two legs 76a and 76b are configured so that the length of the body 74b divided by the substantial width of the body 74b minus the width of the legs 76a and 76b is preferably about 2.3, for example, that is, so that the product of the length of the body 74b divided by the substantial width of the body 74b minus the width of the legs 76a and 76b and the resonant frequency (30 kHz) in drive mode is preferably, for example, $69 \times 10^3$. The "width of the legs 76a and 76b" refers to the sum of the respective widths of the two legs 76a and 76b. In order for the difference between the resonant frequency (e.g., about 30 kHz) in the drive mode of the first tuning fork-type piezoelectric vibrator 70 and the resonant frequency (in-plane, in-phase frequency) in in-plane, in-phase mode thereof to be at least about 1 kHz, the base 74, including the junction 74a and the body 74b, and the two legs 76a and 76b are preferably configured so that the length of the body 74b divided by the substantial width of the body 74b minus the width of the legs 76a and 76b is preferably at least about 2.0, for example, that is, so that the product of the length of the body 74b divided by the substantial width of the body 74b minus the width of the legs 76a and 76b and the resonant frequency (about 30 kHz) in drive mode is preferably at least about $60 \times 10^3$, for example.

Also, in order for the difference between the resonant frequency (e.g., about 48 kHz) in drive mode of the second tuning fork-type piezoelectric vibrator 72 and the resonant frequency (in-plane, in-phase frequency) in in-plane, in-phase mode thereof to be at least about 1 kHz, the base 74, including the junction 74a and the body 74b, and the two legs 76a and 76b are configured so that the length of the body 74b divided by the substantial width of the body 74b minus the width of the legs 76a and 76b is preferably, for example, about 1.4, that is, so that the product of the length of the body 74b divided by the substantial width of the body 74b minus the width of the legs 76a and 76b and the resonant frequency (about 48 kHz) in drive mode is preferably, for example, approximately $67.2 \times 10^3$. In order for the difference between the resonant frequency (about 48 kHz) in the drive mode of the second tuning fork-type piezoelectric vibrator 72 and the resonant frequency (in-plane, in-phase frequency) in in-plane, in-phase mode thereof to be at least about 1 kHz, the base 74, including the junction 74a and the body 74b, and the two legs 76a and 76b are preferably configured so that the length of the body 74b divided by the substantial width of the body 74b minus the width of the legs 76a and 76b is preferably at least about 1.25, for example, that is, so that the product of the length of the body 74b divided by the substantial width of the body 74b minus the width of the legs 76a and 76b and the resonant frequency (for example, about 48 kHz) in drive mode is preferably at least about $60 \times 10^3$, for example.

As shown in FIGS. 4 and 5, the first tuning fork-type piezoelectric vibrator 70 and second tuning fork-type piezoelectric vibrator 72 each include two laminated tuning fork-type piezoelectric substrates 80 and 82. The piezoelectric substrates 80 and 82 are preferable made of a piezoelectric material such as lead zirconate titanate (PZT) and are polarized, for example, in opposite thickness directions.

An internal electrode 84 is provided between the piezoelectric substrates 80 and 82 of each tuning fork-type piezoelectric vibrator.

Three drive detection electrodes 86, 88, and 90 are provided on a surface of the piezoelectric substrate 80 of each tuning fork-type piezoelectric vibrator such that the drive detection electrodes are disposed at intervals in the width direction and opposed to the internal electrode 84. In this case, for example, a first linear groove 80a is provided on the surface of the piezoelectric substrate 80 so as to extend through the approximate center in the width direction, of the leg 76a and a second linear groove 80b is provided thereon so as to extend through the approximate center in the width direction, of the leg 76b. The drive detection electrodes 86 and 88 are separated from each other by the groove 80a. The drive detection electrodes 88 and 90 are separated from each other by the groove 80b. Therefore, the drive detection electrode 86 disposed at an edge extends from the base 74 to the leg 76a. The drive detection electrode 90 disposed at another edge extends from the base 74 to the leg 76b. The surface electrode 88 disposed in the approximate center extends from the base 74 to both the legs 76b and 76b. The width of the grooves 80a and 80b may be larger on the base 74, including the junction 74a, in order to prevent a short cut between the drive detection electrodes 86, 88, and 90 and smaller between the legs 76a and 76b in order to increase the efficiency of the drive detection electrodes 86, 88, and 90.

On the other hand, an overall electrode 92 is provided on a surface of the piezoelectric substrate 82 of each tuning fork-type piezoelectric vibrator. The overall electrode 92 is used to polarize the piezoelectric substrate 82. For this reason, there is no need to provide the overall electrode 92, for example, if the piezoelectric substrate 82 does not need to be polarized.

The first fork tuning-type piezoelectric vibrator 70 and second fork tuning-type piezoelectric vibrator 72 are attached to the electrodes 26a to 26c and electrodes 28a to 28c, respectively, disposed outside the recess 22 of the circuit substrate 20. In this case, the drive detection electrodes 86, 88, and 90 of the junctions 74a of the tuning fork-type piezoelectric vibrators 70 and 72 are connected to the electrodes 26a, 26b, and 26c and electrodes 28a, 28b, and 28c, respectively, preferably using a bonding material 100. As the bonding material 100, for example, an anisotropic, conductive adhesive, a conductive adhesive, a resin-metal composite material, a gold bump, or other suitable material is preferably used. Nonconductivity must be ensured between the drive detection electrodes 86, 88, and 90. Therefore, if an anisotropic, conductive adhesive or a resin-metal composite material is used as the bonding material 100, the bonding material 100 can be provided on substantially the entire surface of the junction 74a of the base 74 on which the three surface electrodes 86, 88, and 90 are disposed. Thus, mass productivity is improved. On the other hand, if other materials are used, it is necessary to divide the surface of the base 74 into the drive detection electrodes 86, 88, and 90 and then provide the bonding material 100 on these electrodes. As shown in FIGS. 1 to 4, the junction 74a of the base 74 of each fork tuning-type piezoelectric vibrator is connected to the circuit substrate 20, and thus, the base is supported by the circuit substrate 20.

The first tuning fork-type piezoelectric vibrator 70 and second tuning fork-type piezoelectric vibrator 72 are arranged in approximately perpendicular directions. Also, vibrators having different resonant frequencies (for example, about 30 kHz and about 48 kHz) are used as the tuning fork-type piezoelectric vibrators 70 and 72 so as to prevent vibrations made by each vibrator from affecting the other vibrator. The legs 76a and 76b of the first tuning fork-type piezoelectric vibrator 70 are preferably longer than those of the second tuning fork-type piezoelectric vibrator 72. Thus, the first tuning fork-type piezoelectric vibrator 70 has a resonant frequency lower than that of the second tuning fork-type piezoelectric vibrator 72.

The first tuning fork-type piezoelectric vibrator 70 having the lower resonant frequency is connected to the electrodes 26a to 26c provided near the short side of the circuit substrate 20. The second tuning fork-type piezoelectric vibrator 72 having the higher resonant frequency is connected to the electrodes 28a to 28c provided near the long side of the circuit substrate 20. The legs 76a and 76b of each fork tuning-type piezoelectric vibrator extend toward the recess 24 along the short side or long side of the circuit substrate 20.

A circuit defined by the IC 50, chip capacitors 60, and other circuit elements is connected to the external electrodes 40 provided on the second surface of the circuit substrate 20 via the electrodes 24, counter electrodes 30 and wiring members (not shown). The drive detection electrodes 86, 88, and 90 of each fork tuning-type piezoelectric vibrator are connected to a circuit of the IC 50 via the electrodes 26a to 26c or electrodes 28a to 28c, and wiring members (not shown), as well as to the inspection electrodes 42a to 42h provided on the second surface of the circuit substrate 20. In this case, the respective drive detection electrodes 86, 88, and 90 of the tuning fork-type piezoelectric vibrators 70 and 72 are connected to the four inspection electrodes 42a to 42d and the four inspection electrodes 42e to 42h, respectively, which are arranged in two lines.

The surface electrode 88 disposed in the approximate center of the first tuning fork-type piezoelectric vibrator 70 is connected to the two outer inspection electrodes 42a and 42d among the four inspection electrodes 42a to 42d arranged side by side. The drive detection electrodes 86 and 90 disposed at both edges of the vibrator 70 are connected to the inner two inspection electrodes 42b to 42c. Also, the drive detection electrode 88 disposed in the approximate center of the second tuning fork-type piezoelectric vibrator 72 is connected to the two outer inspection electrodes 42e and 42h among the four inspection electrodes 42e to 42h arranged side by side. The drive detection electrodes 86 and 90 disposed at both edges of the vibrator 72 are connected to the inner two inspection electrodes 42f and 42g.

A cap 110 is mounted on the first surface of the circuit substrate 20 so as to cover the IC 50, chip capacitors 60, and tuning fork-type piezoelectric vibrators 70 and 72. The cap 110 is preferably made of a material, such as alumina or German silver, for example, and has shape of a substantially rectangular container so as to correspond to the shape of the circuit substrate 20.

In order to mount the cap 110 on the circuit substrate 20, a cap adhesive 112 is preferably provided between the edges of the cap 110 and the circuit substrate 20. If the insulative cap 110 made of alumina is mounted, an epoxy adhesive, for example, is preferably used as the cap adhesive 112. If the conductive cap 110 made of German silver is mounted, an epoxy adhesive, an epoxy conductive adhesive, for example, is preferably used as the cap adhesive 112.

The cap 110 has a through hole 114 which prevents explosions. The through hole 114 is provided near a corner of the cap 110 in a location corresponding to the base 74 of the first tuning fork-type piezoelectric vibrator 70. Alternatively, the through hole 114 may be provided near a corner of the cap 110 in a location corresponding to the base 74 of the second tuning fork-type piezoelectric vibrator 72. In other words, it is preferable to provide the through hole 114 in a location where the through hole 114 would not be disposed over the IC 50 even if the cap 110 is rotated by about 180° and then mounted on the circuit substrate 20.

Figure 6:
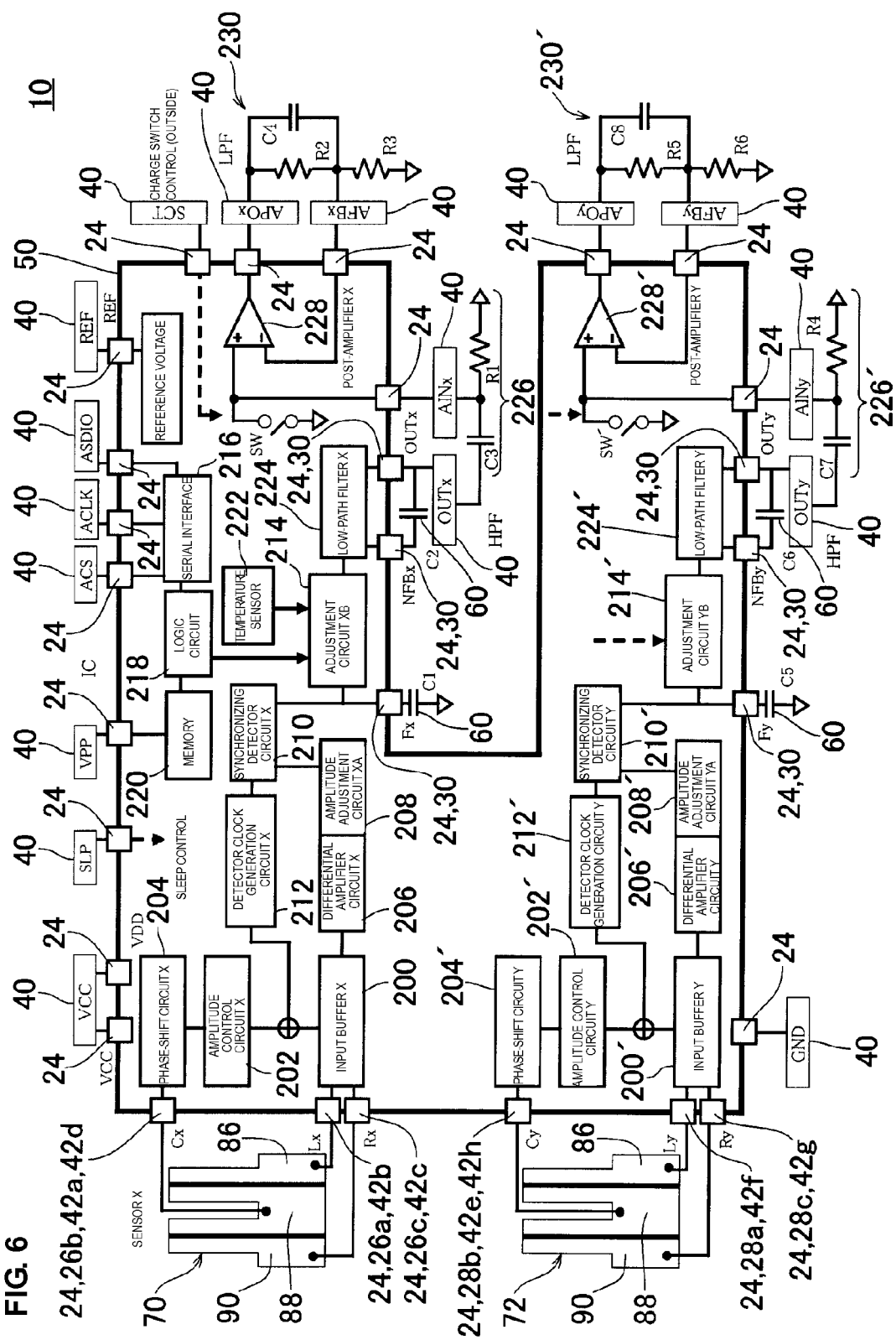
FIG. 6 is a block diagram showing a circuit configuration of the angular velocity sensor shown in FIG. 1.

Next, a circuit configuration of the angular velocity sensor 10 will be described with reference to FIG. 6. In the angular velocity sensor 10, a circuit configuration related to the first tuning fork-type piezoelectric vibrator 70 and a circuit configuration related to the second tuning fork-type piezoelectric vibrator 72 preferably are substantially the same as each other. Therefore, first, the circuit configuration related to the first tuning fork-type piezoelectric vibrator 70 will be described in detail and, then, the circuit configuration related to the second tuning fork-type piezoelectric vibrator 72 will be briefly described.

In the angular velocity sensor 10, the drive detection electrodes 86 and 90 of the first tuning fork-type piezoelectric vibrator 70 are connected to two input terminals of an input buffer 200 included in the IC 50 via the electrodes 24, 26a, and 26c, and wiring members (not shown). The input buffer 200 includes one first output terminal and two second output terminals. The first output terminal is used to output a signal that is the sum of signals input to the two input terminals. The second two output terminals are used to output signals input to the two input terminals. In the IC 50, the first output terminal of the input buffer 200 is connected to an input terminal of an amplitude control circuit 202 to control the amplitude of a signal. An output terminal of the amplitude control circuit 202 is connected to an input terminal of a phase-shift circuit 204 to correct the phase of a signal. An output terminal of the phase-shift circuit 204 in the IC 50 is connected to the drive detection electrode 88 of the first tuning fork-type piezoelectric vibrator 70 via the electrodes 24 and 26b, and wiring members (not shown). Thus, a drive feedback loop is provided in the first tuning fork-type piezoelectric vibrator 70. As described above, the drive detection electrodes 86, 88, and 90 of the first tuning fork-type piezoelectric vibrator 70 are connected to the four corresponding inspection electrodes 42a to 42d.

In the IC 50, the two second output terminals of the input buffer 200 are connected to two input terminals of a differential amplifier circuit 206. An output terminal of the differential amplifier circuit 206 is connected to a first input terminal of a synchronizing detector circuit 210 via an amplitude adjustment circuit 208. Also, the first output terminal of the input buffer 200 is connected to a second input terminal of the synchronizing detector circuit 210 via a detection clock generation circuit 212. The synchronizing detector circuit 210 is arranged to detect a signal input to a first input terminal thereof in synchronization with a signal (detection clock) input to a second input terminal thereof. An output terminal of the synchronizing detector circuit 210 is connected to one external electrode (electrode 24) of the IC 50. A capacitor C1 (chip capacitor 60) is connected between this external electrode and another external electrode (another electrode 24, external electrode 40 (REF)) of the IC 50 to which a reference voltage is to be applied, via a counter electrode 30 and a wiring member (not shown).

In addition, in the IC 50, the output terminal of the synchronizing detector circuit 210 is connected to one input terminal of an adjustment circuit 214. The adjustment circuit 214 is arranged to compensate for a variation due to a temperature variation in a signal output from the synchronizing detector circuit 210. For this reason, the IC 50 includes a serial interface 216, a logic circuit 218, a memory 220, and a temperature sensor 222. Three input terminals of the serial interface 216 are connected to three external electrodes (three electrodes 24) of the IC 50 and three external electrodes 40 (ACS, ACLK, and ASDIO), for example. An output terminal of the serial interface 216 is connected to an input terminal of the logic circuit 218. An output/input terminal of the logic circuit 218 is connected to an output/input terminal of the memory 220. A VPP voltage terminal of the memory 220 is connected to an external electrode (electrode 24) of the IC 50 and an external electrode 40 (VPP). Thus, various types of data, such as data related to actually measured variations in impedance characteristic of the first tuning fork-type piezoelectric vibrator 70 due to temperature variations, can be stored from the external electrode 40 into the memory 220 via the serial interface 216 and logic circuit 218. An output terminal of the logic circuit 218 is connected to another input terminal of the adjustment circuit 214. Thus, data stored in the memory 220 can be provided to the adjustment circuit 214 via the logic circuit 218. An output terminal of the temperature sensor 222 is connected to yet another input terminal of the adjustment circuit 214. Thus, the adjustment circuit 214 can compensate for a variation due to a temperature variation in a signal input thereinto, that is, a signal output from the synchronizing detector circuit 210 based on data stored in the memory 220 and a signal output from the temperature sensor 222.

Although not shown, the memory 220 is also connected to the above-mentioned amplitude adjustment circuit 208. This allows the amplitude adjustment circuit 208 to adjust the amplitude of a signal output from the differential amplifier circuit 206 based on data related to a gain stored in the memory 220.

In the IC 50, an output terminal of the adjustment circuit 214 is connected to an input terminal of a low-pass filter 224. The low-pass filter 224 is arranged to pass angular velocity signals having frequencies in a low frequency band, for example, including about 10 Hz to about 50 Hz, among angular velocity signals detected by the angular velocity sensor. Output terminals of the low-pass filter 224 are connected to an external electrode (electrode 24) of the IC 50 and an electrode 30, and an external electrode 40 (OUTx). The low-pass filter 224 includes another output terminal arranged to pass and output an input signal, and the other output terminal is connected to another external electrode (electrode 24) of the IC 50 and another electrode 30. A capacitor C2 (chip capacitor 60) is connected between the first and second output terminals of the low-pass filter 224 (between the electrodes 30).

The first output terminal of the low-pass filter 224, that is, the external electrode 40 (OUTx) is connected to an input terminal of an externally provided high-pass filter 226. The high-pass filter 226 is arranged to cut off a direct-current component of a signal. The high-pass filter 226 includes a capacitor C3 and a resistor R1. The capacitor C3 is connected between an input terminal and an output terminal of the high-pass filter 226. The resistor R1 is connected between the output terminal of the high-pass filter 226 and another external electrode 40 (REF) to which the reference voltage of the IC 50 is to be applied.

The output terminal of the high-pass filter 226, that is, the contact between the capacitor C3 and resistor R1 is connected to an external electrode 40 (AINx). The external electrode 40 (AINx) is connected to a positive input terminal of an operational amplifier 228 in a first post-amplifier of the IC 50 via an electrode 24. The first post-amplifier is arranged to amplify the amplitude of a signal input into the external electrode 40 (AINx), for example, about fifty times. A negative input terminal of the operational amplifier 228 is connected to an external electrode 40 (AFBx) via an electrode 24, and an output terminal thereof is connected to another external electrode 40 (APOx) via another electrode 24. An externally provided low-pass filter 230 is connected to the external electrodes 40 (AFBx, APOx). The low-pass filter 230 includes a resistor R2 and a capacitor C4, which are connected in parallel between the external electrodes 40 (AFBx, APOx). A resistor R3 is connected between the external electrode 40 (AFBx) and another external electrode 40 (REF) to which the reference voltage is to be applied. This allows the first post-amplifier including the operational amplifier 228 to amplify the amplitude of a signal input into the external electrode 40 (AINx), for example, about fifty times and to output the resultant signal from the output terminal of the operational amplifier 228, that is, the external electrode 40 (APOx).

The IC 50 includes a switch SW. The switch SW is connected between an external electrode (electrode 24) of the IC 50 connected to the external electrode 40 (AINx) and another electrode (another electrode 24) of the IC 50 connected to another external electrode 40 (REF) to which the reference voltage of the IC 50 is to be applied. Also, the switch SW is connected to an external electrode (electrode 24) of the IC 50 connected to an external electrode 40 (SCT). The switch SW is turned on or off in accordance with a control signal input to the external electrode 40 (SCT). If the capacitor C3 of the high-pass filter 226 is charged by activating the switch SW, for example, for about 0.2 sec., a signal from the output terminal of the low-path filter 224, that is, the external electrode 40 (OUTx) is transmitted to the positive input terminal of the operational amplifier 228 within a short time. This reduces the rising time of an output signal at the output terminal of the operational amplifier 228, that is, an external electrode 40 (APOx).

An external electrode 40 (VCC) is connected to electrodes 24 connected to the VCC and VDD of the IC 50 via wiring members (not shown). An external electrode 40 (GND) is connected to an electrode 24 connected to a GND of the IC 50 via a wiring member (not shown). An external electrode 40 (SLP) is connected to an electrode 24 connected to a sleep control terminal of the IC 50 via a wiring member (not shown).

In the angular velocity sensor 10, as with the first tuning fork-type piezoelectric vibrator 70, the drive detection electrodes 86 and 90 of the second tuning fork-type piezoelectric vibrator 72 are connected to two input terminals of an input buffer 200', which is substantially equivalent to the input buffer 200, included in the IC 50 via electrodes 24, 28a, and 28c and wiring members (not shown). A first output terminal of the input buffer 200' is connected to the drive detection electrode 88 of the second tuning fork-type piezoelectric vibrator 72 via an amplitude control circuit 202', which is substantially equivalent to the amplitude control circuit 202, a phase-shift circuit 204', which is substantially equivalent to the phase-shift circuit 204, electrodes 24 and 28b, and wiring members (not shown). Thus, a feedback loop is also provided in the second tuning fork-type piezoelectric vibrator 72. Note that this drive feedback loop is configured so that the drive frequency (e.g., about 48 kHz) of the second tuning fork-type piezoelectric vibrator 72 is higher than the drive frequency (e.g., about 30 kHz) of the first tuning fork-type piezoelectric vibrator 70.

Two second output terminals of the input buffer 200' are also connected to a first input terminal of a synchronizing detector circuit 210', which is substantially equivalent to the synchronizing detector circuit 210, via a differential amplifier circuit 206', which is substantially equivalent to the differential amplifier circuit 206, and an amplitude adjustment circuit 208', which is substantially equivalent to the amplitude adjustment circuit 208. Also, the first output terminal of the input buffer 200' is connected to a second input terminal of the synchronizing detector circuit 210' via a detection clock generation circuit 212', which is substantially equivalent to the detection clock generation circuit 212. Although not shown, the memory 220 is also connected to the amplitude adjustment circuit 208'. This allows the amplitude adjustment circuit 208' to adjust the amplitude of a signal output from the differential amplifier circuit 206' based on data related to a gain stored in the memory 220. Also, the detection clock generation circuit 212' generates a detection clock having a shorter cycle than that of the detection clock generation circuit 212 in accordance with the higher drive frequency of the second tuning fork-type piezoelectric vibrator 72. The cycle of detection of the synchronizing detector circuit 210' is also shorter than that of the synchronizing detector circuit 210.

The output terminal of the synchronizing detector circuit 210' is connected to one external electrode (electrode 24) of the IC 50 and an electrode 30. A capacitor C5 (chip capacitor 60) is connected between the electrode 30 and another external electrode (another electrode 24, external electrode 40 (REF)) of the IC 50 to which the reference voltage is to be applied.

In addition, in the IC 50, the output terminal of the synchronizing detector circuit 210' is connected to one input terminal of an adjustment circuit 214', which is substantially equivalent to the adjustment circuit 214. Also, the memory 220 and the temperature sensor 222 are connected to another input terminal and yet another input terminal, respectively, of the adjustment circuit 214'. Thus, data stored in the memory 220 can be provided to the adjustment circuit 214'. Also, the adjustment circuit 214' can compensate for a variation due to a temperature variation in a signal output from the synchronizing detector circuit 210' based on data related to the second tuning fork-type piezoelectric vibrator 72 stored in the memory 220 and a signal output from the temperature sensor 222.

In the IC 50, an output terminal of the adjustment circuit 214' is connected to an input terminal of a low-pass filter 224', which is substantially equivalent to the low-pass filter 224. A first output terminal of the low-pass filter 224' is connected to an external electrode (electrode 24) of the IC 50, an electrode 30, and an external electrode 40 (OUTy). A second output terminal thereof is connected to another external electrode (electrode 24) of the IC 50 and another electrode 30. A capacitor C6 (chip capacitor 60) is connected between the first and second output terminals of the low-pass filter 224' (between the electrodes 30).

The output terminal of the low-pass filter 224', that is, the external electrode 40 (OUTy) is connected to an input terminal of an externally provided high-pass filter 226', which is equivalent to the high-pass filter 226. A capacitor C7 is connected between an input terminal and an output terminal of the high-pass filter 226'. A resistor R4 is connected between the output terminal of the high-pass filter 226 and another external electrode 40 (REF) to which the reference voltage of the IC 50 is to be applied.

The output terminal of the high-pass filter 226', that is, the contact between the capacitor C7 and resistor R4 is connected to an external electrode 40 (AINy). The external electrode 40 (AINy) is connected to a positive input terminal of an operational amplifier 228' used in a second post-amplifier, which is substantially equivalent to the first post-amplifier, of the IC 50 via an electrode 24. The second post-amplifier is arranged to amplify the amplitude of a signal input into the external electrode 40 (AINy), for example, about fifty times. A negative input terminal of the operational amplifier 228' is connected to an external electrode 40 (AFBy) via an electrode 24. An output terminal thereof is connected to another external electrode 40 (APOy) via another electrode 24. An externally provided low-pass filter 230', which is substantially equivalent to the low-pass filter 230, is connected to the external electrodes 40 (AFBy, APOy). A resistor R5 and a capacitor C8 of the low-pass filter 230' are connected in parallel between the external electrodes 40 (AFBy, APOy). Also, a resistor R6 is connected between the external electrode 40 (AFBy) and another external electrode 40 (REF) to which the reference voltage is to be applied. This allows the second post-amplifier including the operational amplifier 228' to amplify the amplitude of a signal input into the external electrode 40 (AINy), for example, about fifty times and to output the resultant signal from the output terminal of the operational amplifier 228', that is, the external electrode 40 (APOy).

Also, the IC 50 includes a switch SW', which is substantially equivalent to the switch SW. The switch SW' is connected between an external electrode (electrode 24) of the IC 50 connected to the external electrode 40 (AINy) and another external electrode (another electrode 24) of the IC 50 connected to another external electrode 40 (REF) to which the reference voltage of the IC 50 is to be applied. The switch SW' is also connected to an external electrode (electrode 24) of the IC 50 and the external electrode 40 (SCT). The switch SW' is also turned on or off in accordance with a control signal input to the external electrode 40 (SCT). Thus, if the capacitor C7 of the high-pass filter 226' is charged by activating the switch SW', e.g., for about 0.2 sec., a signal from the output terminal of the low-pass filter 224', that is, the external electrode 40 (OUTy) is transmitted to the positive input terminal of the operational amplifier 228' within a short time. This reduces the rising time of an output signal at the output terminal of the operational amplifier 228', that is, the external electrode 40 (APOy).

Hereafter, an example of a method for manufacturing the first (second) tuning fork-type piezoelectric vibrator 70 (72) used in the above-mentioned angular velocity sensor 10 will be described.

First, a multilayer substrate is provided. This multilayer substrate is formed by alternately laminating first and second piezoelectric substrates and first to third electrodes. The first piezoelectric substrate will be divided into many piezoelectric substrates 80 and the second piezoelectric substrate will be divided into many piezoelectric substrates 82. In the multilayer substrate, the first electrode disposed between the two piezoelectric substrates will be divided into many internal electrodes 84. The second electrode arranged on a surface of the first piezoelectric surface will be divided into many drive detection electrodes 86, 88, and 90. The third electrode disposed on a surface of the second piezoelectric substrate will be divided into many overall electrodes 92.

Then, in the multilayer substrate, a direct-current voltage is applied between the first and second electrodes disposed on both the surfaces of the first piezoelectric substrate and between the first and third electrodes disposed on both the surfaces of the second piezoelectric substrate. Thus, the first and second piezoelectric substrates are polarized in opposite thickness directions.

Subsequently, the polarized multilayer substrate is cut into many substantially rectangular chips each surrounding a tuning fork-type piezoelectric vibrator 70 (72). Then, slits are preferably formed in each of the obtained chips so that the base 74 and legs 76a and 76b are formed. Then, the grooves 80a and 80b are formed on the base 74 and legs 76a and 76b. Alternatively, first, the grooves 80a and 80b may be formed on each of the chips and, then, the base 74 and legs 76a and 76b may be formed. In this manner, individual tuning fork-type piezoelectric vibrators 70 (72) are manufactured.

Alternatively, first, a groove corresponding to the groove 80a between the drive detection electrodes 86 and 88 of each of many tuning fork-type piezoelectric vibrators 70 (72) and a groove corresponding to the groove 80b between the drive detection electrodes 88 and 90 thereof may preferably be formed on the first piezoelectric substrate of the multilayer substrate polarized in the above-mentioned manner and the second electrode on the surface of the first piezoelectric substrate. Then, the multilayer substrate having the grooves corresponding to the grooves 80a and 80b may preferably be cut off along the outlines of tuning fork-type piezoelectric vibrators 70 (72) to obtain the tuning fork-type piezoelectric vibrators 70 (72).

In the process of manufacturing the tuning fork-type piezoelectric vibrators 70 (72) as described above, the base 74, including the body 74b, and the leg 76a and 76b are formed on each tuning fork-type piezoelectric vibrator 70 (72) using the relationship between the length of the body 74b divided by the substantial width of the body 74b minus the width of the legs 76a and 76b and the resonant frequency in the drive mode.

Specifically, in order to manufacture each first tuning fork-type piezoelectric vibrator 70, the base 74, including the junction 74a and the body 74b, and the two legs 76a and 76b are configured so that the length of the body 74b divided by the substantial width of the body 74b minus the width of the legs 76a and 76b is preferably, about 2.3, for example, that is, such that the product of the length of the body 74b divided by the substantial width of the body 74b minus the width of the legs 76a and 76b and the resonant frequency (e.g., about 30 kHz) in drive mode is preferably about $69 \times 10^3$, for example.

In addition, in order to manufacture each second tuning fork-type piezoelectric vibrator 72, the base 74, including the junction 74a and the body 74b, and the two legs 76a and 76b are formed so that the length of the body 74b divided by the substantial width of the body 74b minus the width of the legs 76a and 76b is preferably about 1.4, for example, that is, such that the product of the length of the body 74b divided by the substantial width of the body 74b minus the width of the legs 76a and 76b and the resonant frequency (e.g., about 48 kHz) in drive mode is preferably $67.2 \times 10^3$, for example.

In this manner, the first tuning fork-type piezoelectric vibrators 70 and second tuning fork-type piezoelectric vibrators 72, in both of which the difference between the resonant frequency in the drive mode and the resonant frequency (in-plane, in-phase frequency) in in-plane, in-phase mode is at least about 1 kHz, are manufactured.

Next, the operating state of the above-mentioned angular velocity sensor 10 will be described. In the angular velocity sensor 10, for example, the first tuning fork-type piezoelectric vibrator 70 is used to detect a rotation angular velocity applied about the X axis parallel or substantially parallel with the short sides of the circuit substrate 20 and the second tuning fork-type piezoelectric vibrator 72 is used to detect a rotation angular velocity applied about the Y axis parallel or substantially parallel with the long sides of the circuit substrate 20.

Figure 7:
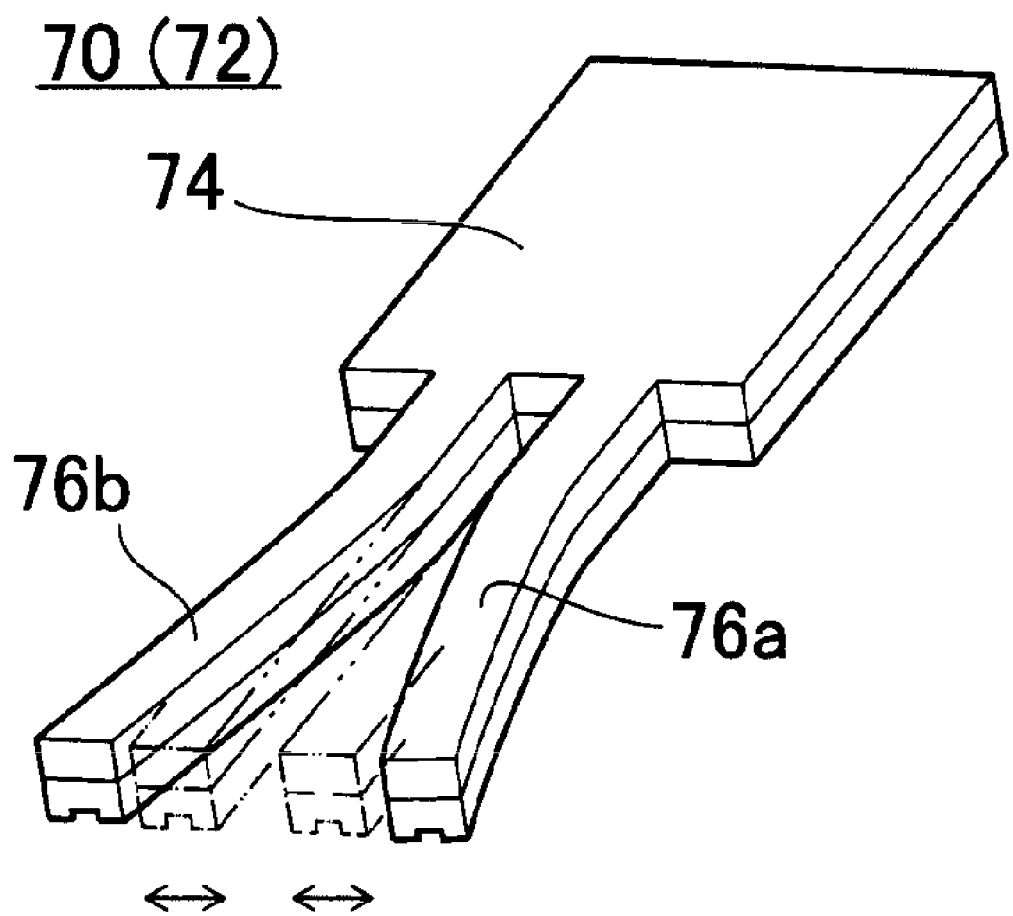
FIG. 7 is a drawing showing a state where the tuning fork-type piezoelectric vibrator of the angular velocity sensor shown in FIG. 1 is making basic vibrations.

In the first tuning fork-type piezoelectric vibrator 70, a self-excitation drive circuit is provided by the drive feedback loop including the input buffer 200, amplitude control circuit 202, and phase-shift circuit 204. For example, as shown in FIG. 7, the legs 76a and 76b make basic vibrations at the resonant frequency (e.g., about 30 kHz) in the drive mode such that the legs are both opened or closed. In a state in which the legs 76a and 76b are both opened (in a state shown by a solid line in FIG. 7), a portion of the first tuning fork-type piezoelectric vibrator 70 having the drive detection electrode 88 disposed in the approximate center expands and portions thereof having the drive detection electrodes 86 and 90 disposed at both edges contract. Conversely, in a state in which the legs 7a and 76b are both closed, the portion of the first tuning fork-type piezoelectric vibrator 70 having the drive detection electrode 88 disposed in the approximate center contracts and the portions thereof having the drive detection electrodes 86 and 90 expand. When making such basic vibrations, the two legs 76a and 76b vibrate symmetrically in the same state with respect to polarized directions. Therefore, the same signals are output from the drive detection electrodes 86 and 90 disposed at both edges. Thus, a signal "0" is output from the differential amplifier circuit 206 dedicated to a detection circuit and in turn from the external electrode 40 (APOx).

Figure 8:
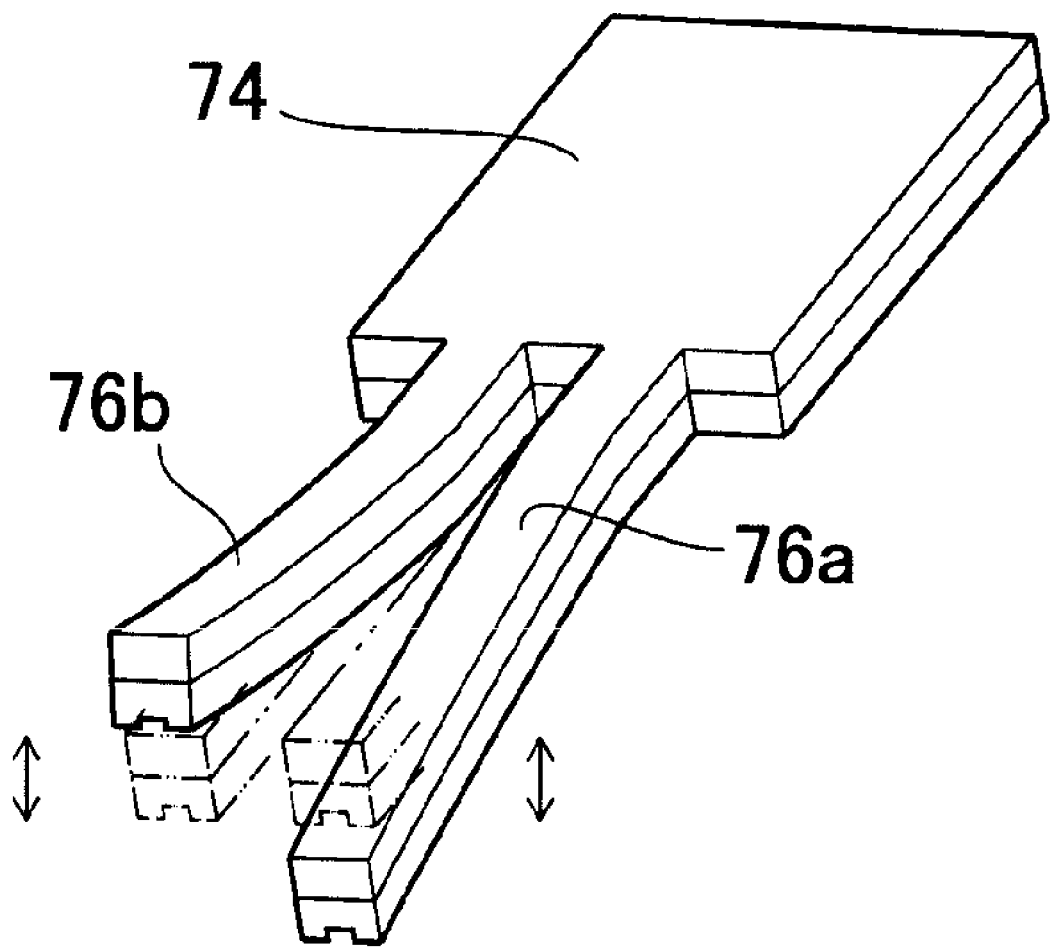
FIG. 8 is a drawing showing a state where the tuning fork-type piezoelectric vibrator of the angular velocity sensor shown in FIG. 1, which is making basic vibrations shown in FIG. 7, is being displaced due to application of a rotation angular velocity.

When a rotation angular velocity is applied around the X axis while the first tuning fork-type piezoelectric vibrator 70 makes such basic vibrations, a Coriolis acts applied to the legs 76a and 76b of the vibrator 70 in directions perpendicular or substantially perpendicular to the directions of the basic vibrations. Since the Coriolis acting on the leg 76a and that working on the leg 76b are directed in opposite directions, the legs 76a and 76b are displaced in opposite directions, for example, as shown in FIG. 8. In a displacement state shown by a solid line in FIG. 8, for the leg 76a having the drive detection electrode 86, the piezoelectric substrate 80 contracts and the piezoelectric substrate 82 expands. On the other hand, for the leg 76b having the drive detection electrode 90, the piezoelectric substrate 80 expands and the piezoelectric substrate 82 contracts. In a displacement state (not shown) opposite to the displacement state shown by the solid line in FIG. 8, for the leg 76a, the piezoelectric substrate 80 expands and the piezoelectric substrate 82 contracts. On the other hand, for the leg 76b, the piezoelectric substrate 80 contracts and the piezoelectric substrate 82 expands. These displacements cause the drive detection electrodes 86 and 90 disposed at both edges to output signals having opposite phases, as well as cause the differential amplifier circuit 206 to output a large signal corresponding to the rotation angular velocity. The magnitude and polarity of the signals output in this manner correspond to the magnitude of the rotation angular velocity and the rotation direction thereof, respectively.

The amplitude of a signal output from the differential amplifier circuit 206 is adjusted by the amplitude adjustment circuit 208 based on data stored in the memory 220. The amplitude-adjusted signal is detected by the synchronizing detector circuit 210 in synchronization with a detection clock from the detection clock generation circuit 212. A variation due to a temperature variation in the detected signal is compensated for by the adjustment circuit 214. If the frequency of the temperature-compensated signal falls within a required low frequency band, the signal is passed by the low-pass filter 224. Then, a direct-current component of the signal is cut off by the high-pass filter 226. Subsequently, the resultant signal is amplified by the first post-amplifier including the operational amplifier 228 and the like and then output from the output terminal of the operational amplifier 228, that is, an external electrode 40 (APOx). In this manner, the magnitude and rotation direction of the rotation angular velocity applied around the X axis are detected from the magnitude and polarity of the signal output from the external electrode 40 (APOx).

As in the first tuning fork-type piezoelectric vibrator 70, in the second tuning fork-type piezoelectric vibrator 72, the legs 76a and 76b make basic vibrations at the resonant frequency (e.g., about 48 kHz) in the drive mode in accordance with the drive feedback loop including input buffer 200'. Note that, in the second tuning fork-type piezoelectric vibrator 72, the directions of the basic vibrations of the legs 76a and 76b are changed in accordance with a rotation angular velocity applied around the Y axis. Therefore, for the second tuning fork-type piezoelectric vibrator 72, the magnitude and rotation direction of the rotation angular velocity applied around the Y axis are detected from the magnitude and polarity of a signal output from the differential amplifier circuit 206' and in turn from the external electrode 40 (APOy).

In the angular velocity sensor 10, the base 74, including the body 74b, and two legs 76a and 76b of each of the fork tuning-type piezoelectric vibrator 70 and 72 are configured so that the product of the length of the body 74b divided by the substantial width of the body 74b minus the width of the legs 76a and 76b and the resonant frequency in the drive mode is preferably at least about $60 \times 10^3$, for example. Thus, the difference between the resonant frequency in the drive mode and the resonant frequency (in-plane, in-phase frequency) in in-plane, in-phase mode is at least about 1 kHz. Therefore, in the angular velocity sensor 10, the tuning fork-type piezoelectric vibrators 70 and 72 are each prevented from becoming negatively affected by interference between drive vibrations and in-place, in-phase vibrations. Thus, basic characteristics of the angular velocity sensor, such as the sensitivity and offset thereof, are stabilized.

A simulation was conducted to determine whether, if a base, including a body, and two legs of a tuning fork-type piezoelectric vibrator used in an angular velocity sensor, such as the above-mentioned angular velocity sensor 10, are configured so that the product of the length of a body divided by the substantial width of the body minus the width of legs and the resonant frequency in the drive mode is at least about $60 \times 10^3$, the difference between the resonant frequency in drive mode and the resonant frequency (in-plane, in-phase frequency) in in-plane, in-phase mode is at least about 1 kHz. Hereafter, the result of the simulation will be described.

Figure 9:
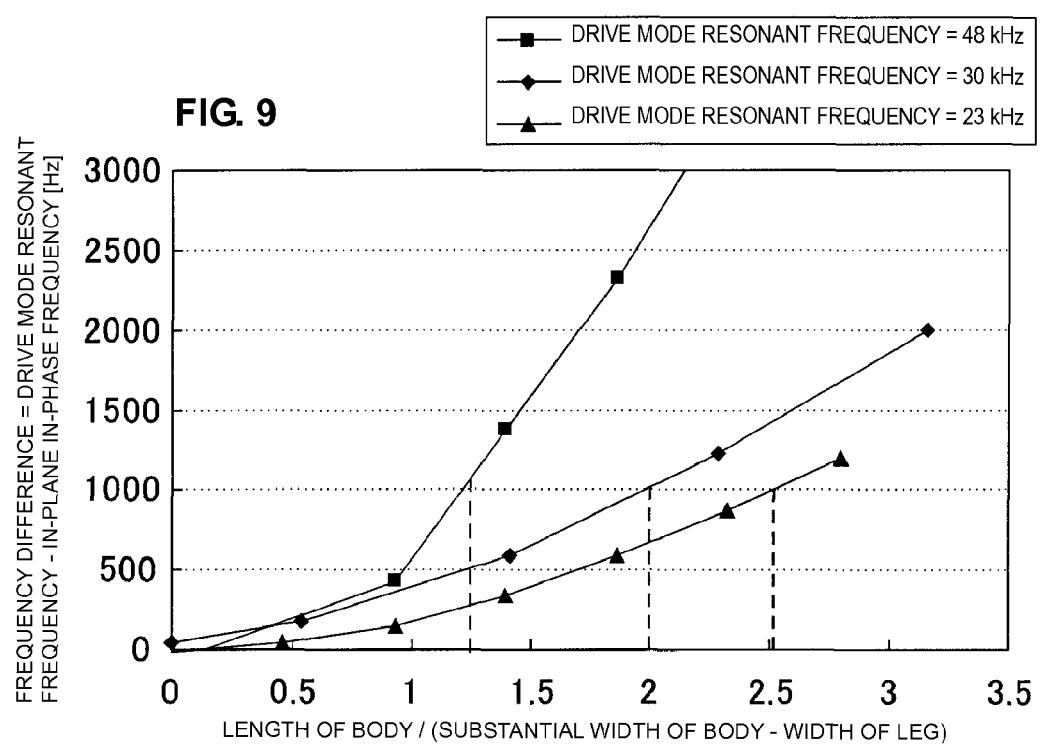
FIG. 9 is a graph showing the relationship between the length of a body divided by the quantity of the substantial width of the body minus the width of legs and the difference between the resonant frequency in drive move and in-plane, in-phase frequency in tuning fork-type piezoelectric vibrators, whose drive mode resonant frequency is about 30 kHz, about 48 kHz, or about 23 kHz.

FIG. 9 is a graph showing the simulation results. The graph shown in FIG. 9 shows the relationship between the length of the body divided by the substantial width of the body minus the width of the legs and the difference between the resonant frequency in drive move and in-plane, in-phase frequency with respect to tuning fork-type piezoelectric vibrators, whose drive mode resonant frequency is about 30 kHz, about 48 kHz, or about 23 kHz, for example.

From the graph shown in FIG. 9, it is understood that, with respect to each of the tuning fork-type piezoelectric vibrators having the different drive mode resonant frequencies, when the product of the length of the body divided by the substantial width of the body minus the width of the legs and the resonant frequency in the drive mode was at least about $60 \times 10^3$, the difference between the resonant frequency in the drive move and in-plane, in-phase frequency was at least about 1 kHz.

In addition, in the above-described angular velocity sensor 10, the tuning fork-type piezoelectric vibrator 70 (72) is directly connected to the circuit substrate 20. Therefore, the cost of the angular velocity sensor 10 is less than those of related-art angular velocity sensors in which tuning fork-type piezoelectric vibrators are connected to a circuit substrate with a different member therebetween.

Further, for the above-mentioned angular velocity sensor 10, if an anisotropic, conductive adhesive is used to connect the tuning fork-type piezoelectric vibrator 70 (72) to the circuit substrate 20, the electrode structure between the tuning fork-type piezoelectric vibrator 70 (72) and circuit substrate 20 is simplified. Also, the mounting of the tuning fork-type piezoelectric vibrator 70 (72) and application of the adhesive are easily controlled, and the cost is reduced accordingly.

Also, for the above-mentioned angular velocity sensor 10, the tuning fork-type piezoelectric vibrator 70 (72) is connected to the circuit substrate 20 using substantially the entire width of the junction 74a of the base 74. Thus, the drive detection electrodes 86, 88, and 90 formed by forming the linear grooves 80a and 80b are each in conduction with one another. This simplifies the structure and increases the productivity.

In the above-mentioned method for manufacturing the tuning fork-type piezoelectric vibrator 70 (72), the base 74, including the body 74b, and two legs 76a and 76b are formed using the relationship between the length of the body 74b divided by the substantial width of the body 74b minus the width of the legs 76a and 76b and the resonant frequency in drive mode, which was newly discovered by the inventors of the present invention. Thus, tuning fork-type piezoelectric vibrators in which the difference between the resonant frequency in the drive mode and the resonant frequency (in-plane, in-phase frequency) in in-plane, in-phase mode is at least about 1 kHz and that is prevented from becoming affected by interference between drive vibrations and in-place, in-phase vibrations are manufactured.

Also, in the above-mentioned method for manufacturing the tuning fork-type piezoelectric vibrator 70 (72), the multilayer substrate is preferably used as the material for the piezoelectric substrates 80 and 82 of the a plurality of tuning fork-type piezoelectric vibrators 70 (72). Thus, a step of bonding the piezoelectric substrates 80 and 82 together for each tuning fork-type piezoelectric vibrator 70 (72) is omitted. Thus, the tuning fork-type piezoelectric vibrators 70 (72) are easily manufactured. This is also advantageous in that the mass productivity of the tuning fork-type piezoelectric vibrators 70 (72) is improved.

Figure 10:
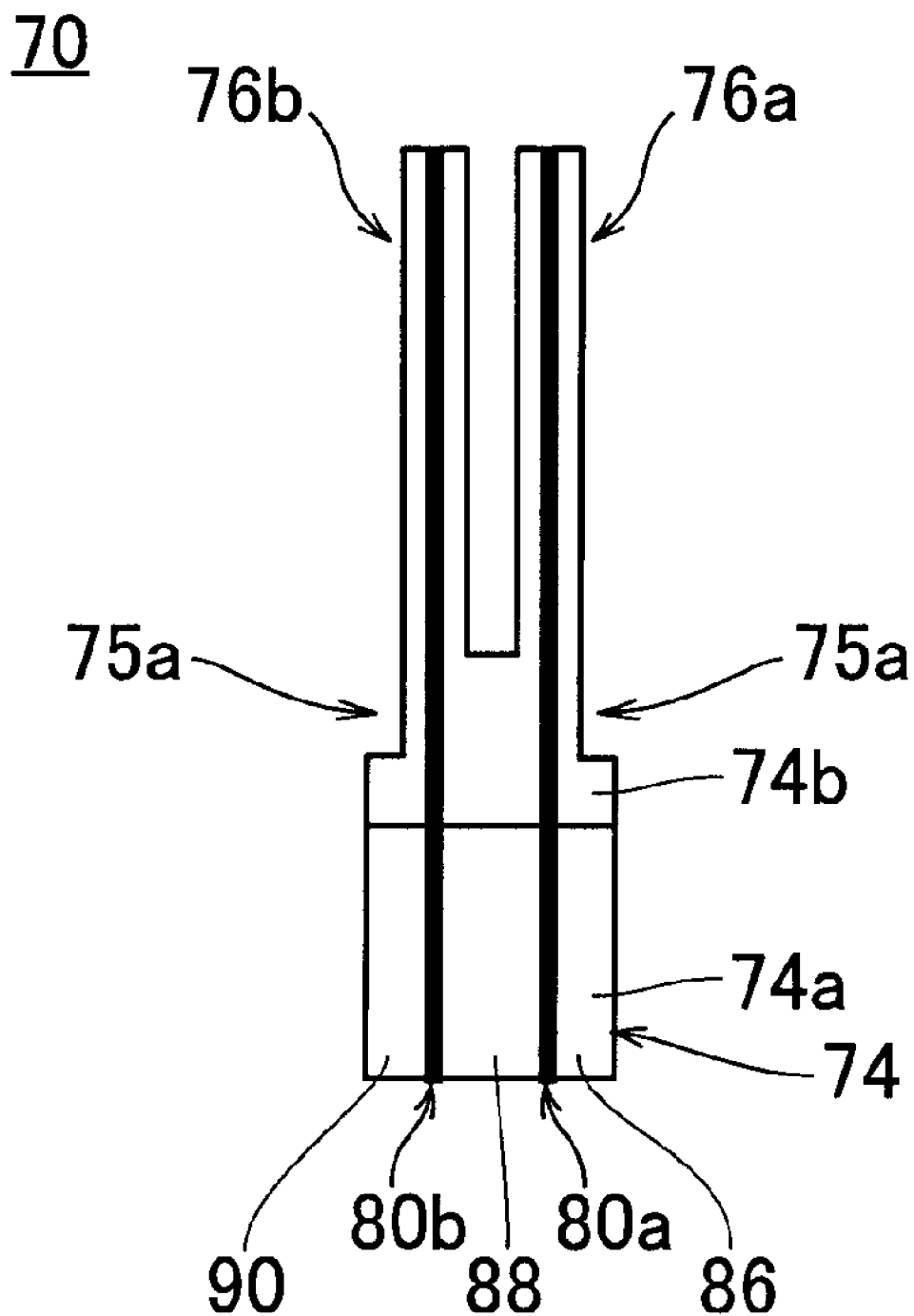
FIG. 10 is a plan view showing another example of a fork tuning-type piezoelectric vibrator used in the angular velocity sensor according to a preferred embodiment of the present invention.

FIG. 10 is a plan view showing another example of a fork tuning-type piezoelectric vibrator used in the angular velocity sensor according to a preferred embodiment of the present invention. In a tuning fork-type piezoelectric vibrator 70 shown in FIG. 10, rectangular recesses 75a are provided on both sides in the width direction of the body 74b of the base 74 along the outlines of the legs 76a and 76b unlike the tuning fork-type piezoelectric vibrator 70 shown in FIGS. 4 and 5.

For the tuning fork-type piezoelectric vibrator 70 shown in FIG. 10, the substantial width of the body 74b is less than that of the tuning fork-type piezoelectric vibrator 70 shown in FIGS. 4 and 5. Thus, the length of the body 74b is reduced so that the difference between the resonant frequency in the drive mode and in-plane, in-phase frequency is at least about 1 kHz while maintaining the size of the junction 74a. As a result, the size of the tuning fork-type vibrator is reduced.

Also, the recesses 75a are easily provided along the outlines of the legs 76a and 76b.

Figure 11:
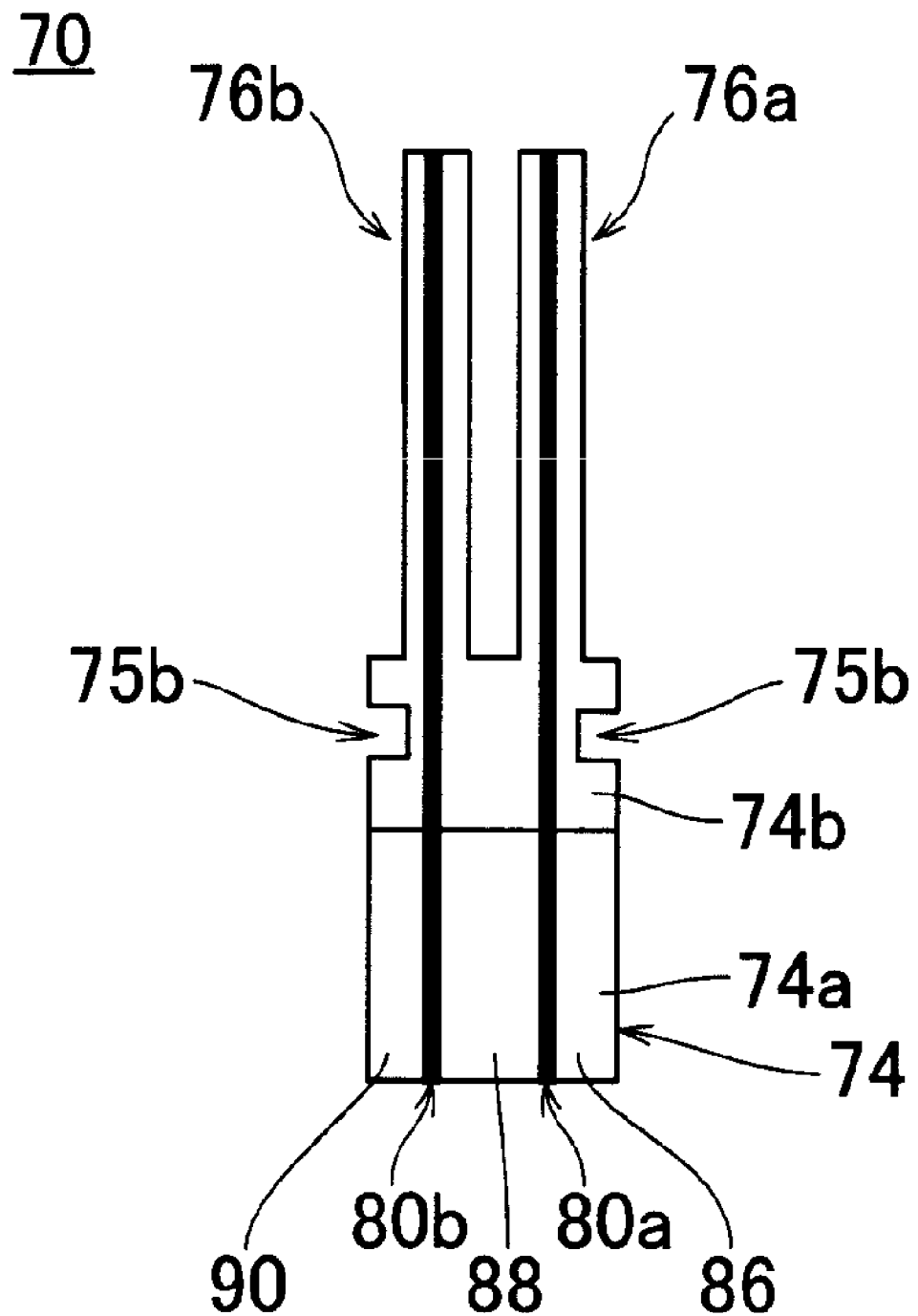
FIG. 11 is a plan view showing yet another example of a fork tuning-type vibrator used in the angular velocity sensor according to a preferred embodiment of the present invention.

FIG. 11 is a plan view showing yet another example of a fork tuning-type piezoelectric vibrator used in the angular velocity sensor according to a preferred embodiment of the present invention. In a tuning fork-type piezoelectric vibrator 70 shown in FIG. 11, rectangular recesses 75b are arranged around the approximate centers of both sides in the width direction, of the body 74b of the base 74 unlike the tuning fork-type piezoelectric vibrator 70 shown in FIGS. 4 and 5.

As with the tuning fork-type piezoelectric vibrator 70 shown in FIG. 10, the substantial width of the body 74b of the tuning fork-type piezoelectric vibrator 70 shown in FIG. 11 is reduced. Thus, the length of the body 74b is reduced so that the difference between the resonant frequency in the drive mode and in-plane, in-phase frequency is at least about 1 kHz while maintaining the size of the junction 74a. As a result, the size of the tuning fork-type vibrator is reduced.

The above-mentioned recesses 75b are easily provided on both sides in width direction of the body 74b of the base 74.

Figure 12:
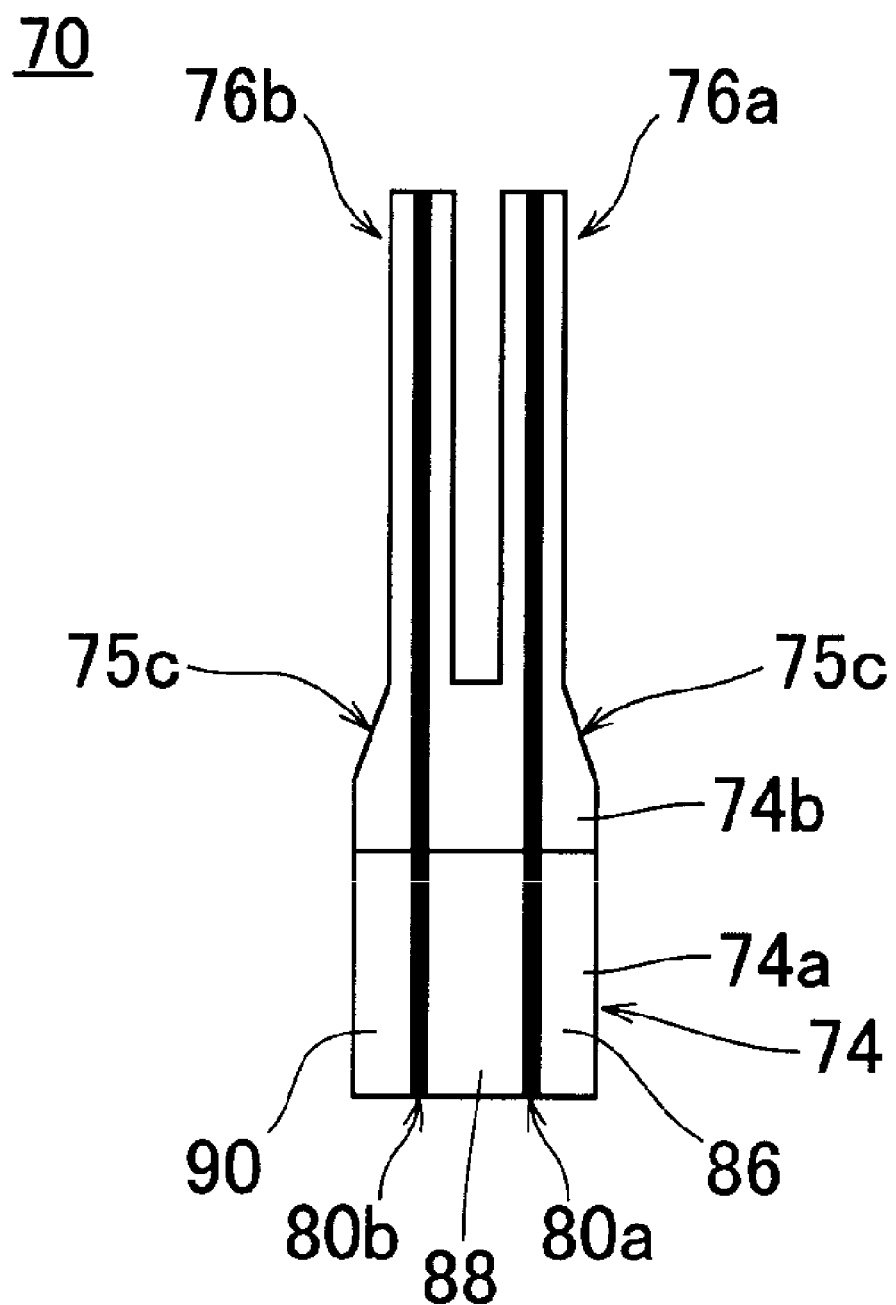
FIG. 12 is a plan view showing yet another example of a fork tuning-type vibrator used in the angular velocity sensor according to a preferred embodiment of the present invention.
Figure 13:
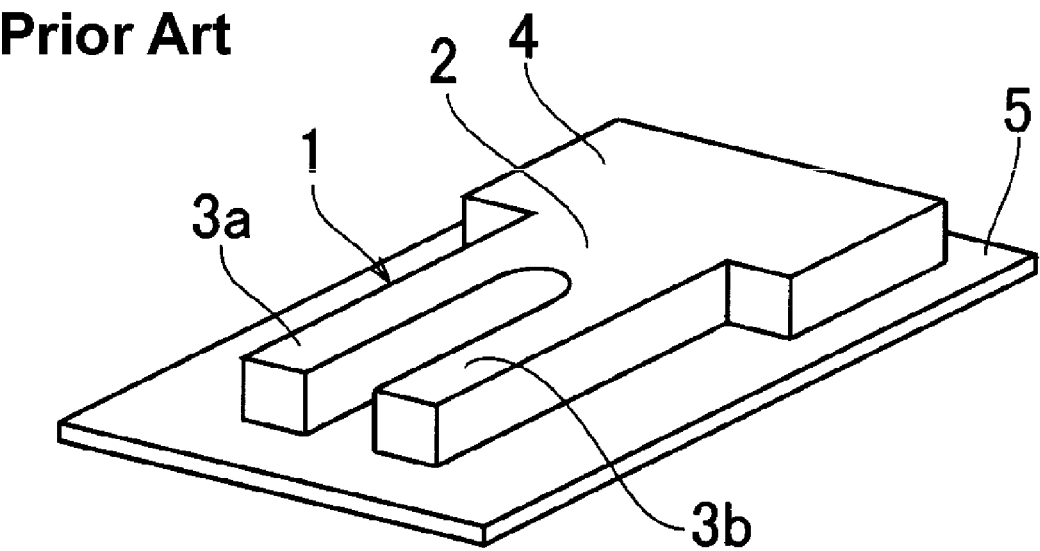
FIG. 13 is a drawing showing an example of a related-art tuning fork-type vibrator.
Figure 14:
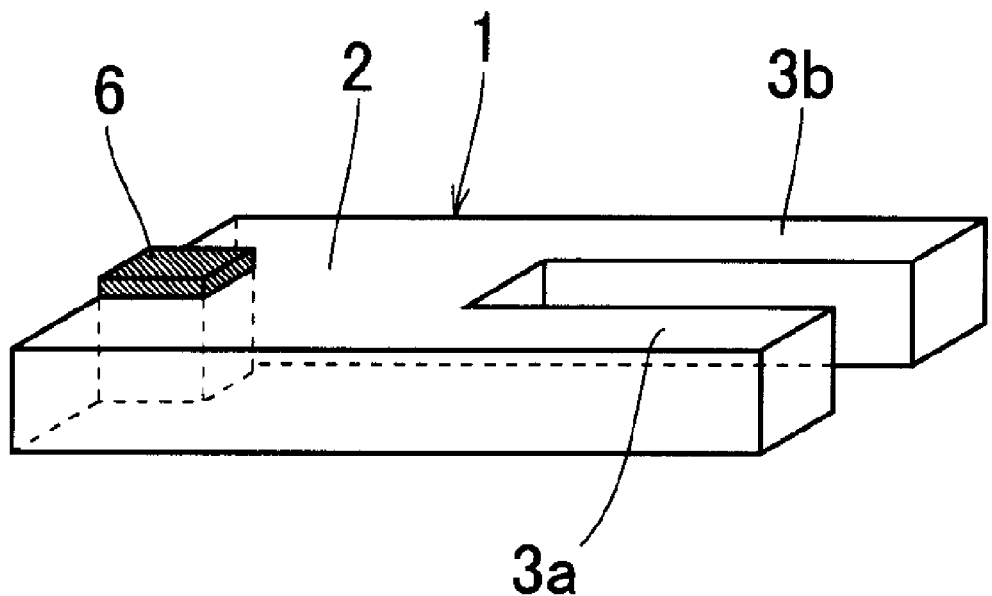
FIG. 14 is a drawing showing another example of a related-art tuning fork-type vibrator.
Figure 15:
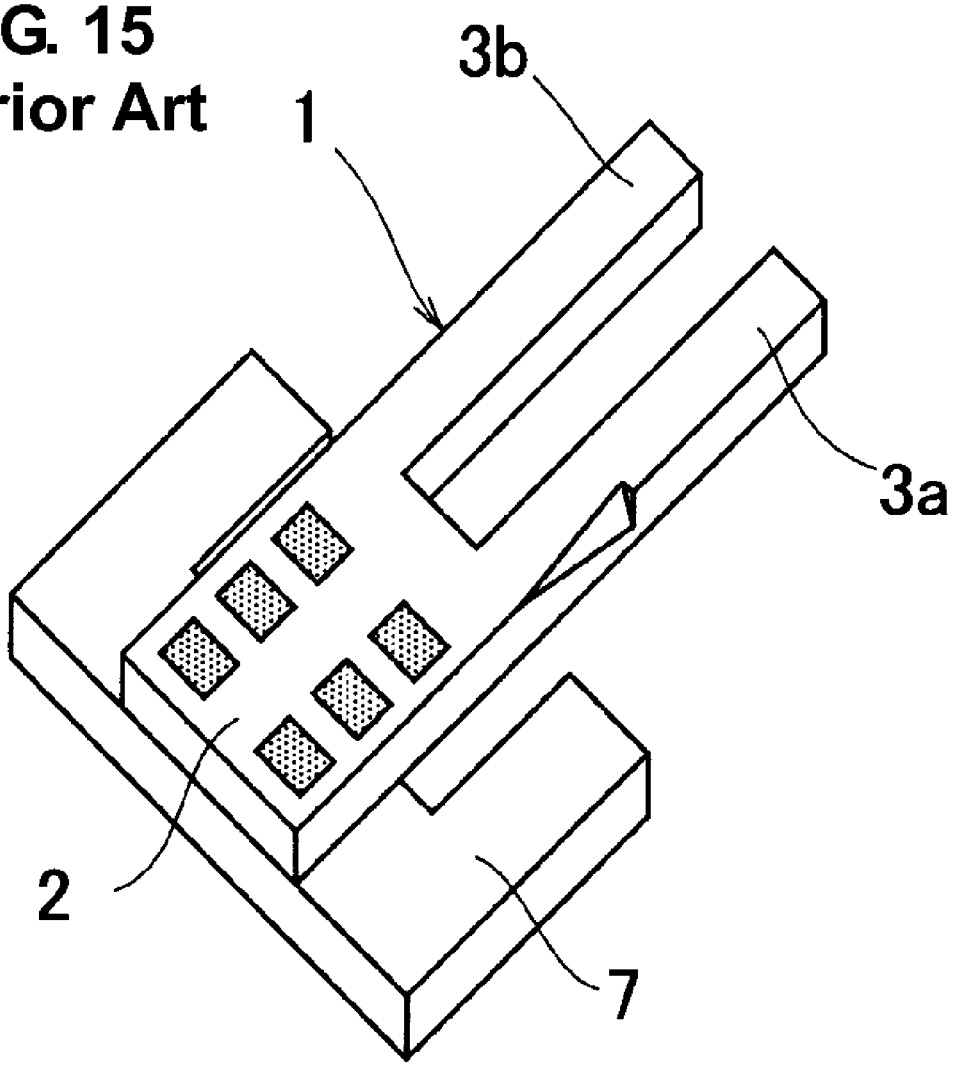
FIG. 15 is a drawing showing yet another example of a related-art tuning fork-type vibrator.

FIG. 12 is a plan view showing yet another example of a fork tuning-type piezoelectric vibrator used in the angular velocity sensor according to a preferred embodiment of the present invention. In a tuning fork-type piezoelectric vibrator 70 shown in FIG. 12, tapered recesses 75c extending from the outlines of the legs 76a and 76b are provided on both sides in the width direction, of the body 74b of the base 74 unlike the tuning fork-type piezoelectric vibrator 70 shown in FIGS. 4 and 5.

As with the tuning fork-type piezoelectric vibrators 70 shown in FIGS. 10 and 11, the substantial width of the body 74b of the tuning fork-type piezoelectric vibrator 70 shown in FIG. 12 is reduced. Thus, the length of the body 74b is reduced so that the difference between the resonant frequency in the drive mode and in-plane, in-phase frequency is at least about 1 kHz while maintaining the size of the junction 74a. As a result, the size of the tuning fork-type vibrator is reduced.

Also, the above-mentioned tapered recesses 75c make the body 74b of the base 74 resistant to chipping.

While the above-mentioned tuning fork-type piezoelectric vibrator 70 (72) is configured to be driven at the particular resonant frequency, e.g., about 30 kHz or about 48 kHz, preferred embodiments of the present invention are also applicable to tuning fork-type piezoelectric vibrators configured to be driven at other resonant frequencies.

While the piezoelectric substrates 80 and 82 are preferably polarized in opposite width directions in the above-mentioned tuning fork-type piezoelectric vibrator 70 (72), the piezoelectric substrates 80 and 82 may be polarized in one common width direction or the piezoelectric substrate 80 alone may be polarized in a width direction.

While the grooves 80a and 80b are preferably provided on the piezoelectric substrate 80 in the above-mentioned tuning fork-type piezoelectric vibrator 70 (72), these grooves are not required, for example, if no short circuit occurs between the adjacent drive detection electrodes.

While the above-mentioned tuning fork-type piezoelectric vibrator 70 (72) preferably includes the two laminated piezoelectric substrates, preferred embodiments of the present invention are also applicable to tuning fork-type vibrators including three or more laminated piezoelectric substrates.

The tuning fork-type vibrator according to preferred embodiments of the present invention can be used in angular velocity sensors and other suitable devices.

While the preferred embodiment of the present invention has been described above, it is to be understood that variations and modifications will be apparent to those skilled in the art without departing from the scope and spirit of the present invention. The scope of the present invention, therefore, is to be determined solely by the following claims.

What is claimed is:

1. A tuning fork-type vibrator comprising:
a base arranged to be supported by a base substrate; and
a leg extending from the base; wherein
the base includes:
- a junction arranged to be connected to the base substrate; and
- a body disposed between the junction and the leg; and the base, including the body, and the leg are configured so that a product of a length of the body divided by a substantial width of the body minus a width of the leg and a resonant frequency in a drive mode is at least about $60 \times 10^3$, where the substantial width is defined as an average width of the body.

2. The tuning fork-type vibrator according to claim 1, wherein a recess is arranged on the body so that the substantial width of the body is less than a width of a widest portion of the body.

3. The tuning fork-type vibrator according to claim 1, wherein the base is substantially rectangular.

4. A method for manufacturing a tuning fork-type vibrator, the tuning fork-type vibrator including a base arranged to be supported by a base substrate and a leg extending from the base, the base including a junction arranged to be connected to the base substrate and a body disposed between the junction and the leg, the method comprising the step of:
forming the base, including the body, and the leg such that a product of a length of the body divided by a substantial width of the body minus a width of the leg and a resonant frequency in a drive mode is at least about $60 \times 10^3$, where the substantial width is defined as an average width of the body.

5. An angular velocity sensor comprising:
the tuning fork-type vibrator according to claim 1.

6. An angular velocity sensor comprising:
a tuning fork-type vibrator obtained by the manufacturing method according to claim 4.

* * * * *